(12) United States Patent
Rugeland et al.

(10) Patent No.: US 12,471,180 B2
(45) Date of Patent: Nov. 11, 2025

(54) CHO IN DC (DUAL CONNECTIVITY)

(71) Applicant: Telefonaktiebolaget LM Ericsson (publ), Stockholm (SE)

(72) Inventors: Patrik Rugeland, Stockholm (SE); Icaro L. J. Da Silva, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 486 days.

(21) Appl. No.: 17/770,882

(22) PCT Filed: Sep. 8, 2020

(86) PCT No.: PCT/SE2020/050846
§ 371 (c)(1),
(2) Date: Apr. 21, 2022

(87) PCT Pub. No.: WO2021/080481
PCT Pub. Date: Apr. 29, 2021

(65) Prior Publication Data
US 2023/0007553 A1   Jan. 5, 2023

Related U.S. Application Data

(60) Provisional application No. 62/925,268, filed on Oct. 24, 2019.

(51) Int. Cl.
*H04W 36/00* (2009.01)
*H04W 36/08* (2009.01)
(Continued)

(52) U.S. Cl.
CPC ....... *H04W 76/30* (2018.02); *H04W 36/0058* (2018.08); *H04W 36/00698* (2023.05);
(Continued)

(58) Field of Classification Search
CPC ....... H04W 36/00837; H04W 36/0069; H04W 36/0058; H04W 36/08; H04W 36/00698; H04W 36/38; H04W 76/30; H04W 76/15
See application file for complete search history.

(56) References Cited

U.S. PATENT DOCUMENTS 11,317,335 B2 * 4/2022 Latheef ............... H04W 36/362
2021/0051534 A1 * 2/2021 Xu ........................ H04W 36/08
(Continued)

FOREIGN PATENT DOCUMENTS

EP   3413625 A1   12/2018

OTHER PUBLICATIONS

International Search Report and Written Opinion dated Dec. 9, 2020 for International Application No. PCT/SE2020/050846 filed Sep. 8, 2020.
(Continued)

*Primary Examiner* — Rasheed Gidado
(74) *Attorney, Agent, or Firm* — Weisberg I.P. Law, P.A.

(57) ABSTRACT

A method performed by a User Equipment (UE) for handling a Conditional Handover (CHO) from a first cell to a second cell in a wireless communications network. The UE is served by a Master Node (MN), in the first cell and by a Secondary Node (SN) in a third cell. The UE receives a CHO configuration from the first network node acting as the MN. The CHO configuration includes an indication to release configurations of any one or more out of: Multi Radio Access Technology Dual Connectivity (MR-DC), and SN terminated bearers. Upon execution of the CHO according to the CHO configuration, the UE releases the MR-DC configuration and/or a configuration for SN terminated bearers.

14 Claims, 17 Drawing Sheets

401. Receive CHO configuration from first network node acting as MN.

402. Transmit indication to SN upon fulfilment of CHO trigger/execution condition is fulfilled indicating that CHO trigger/execution condition towards specific target candidate MN/target candidate cell is executed.

403. Upon execution of CHO according to CHO configuration, release MR-DC configuration and configuration for SN terminated bearers.

Method in the UE 120

(51) Int. Cl.
*H04W 36/36* (2009.01)
*H04W 76/30* (2018.01)

(52) U.S. Cl.
CPC ..... *H04W 36/00837* (2018.08); *H04W 36/08* (2013.01); *H04W 36/362* (2023.05)

(56) References Cited

U.S. PATENT DOCUMENTS

| | | | | |
|---|---|---|---|---|
| 2021/0360496 | A1* | 11/2021 | Ishii | H04W 36/362 |
| 2022/0038963 | A1* | 2/2022 | Zhang | H04W 36/0055 |
| 2022/0159530 | A1* | 5/2022 | Kim | H04W 36/362 |
| 2022/0287133 | A1* | 9/2022 | Hsieh | H04W 76/27 |
| 2022/0322174 | A1* | 10/2022 | Da Silva | H04W 36/0055 |
| 2022/0386197 | A1* | 12/2022 | Hwang | H04W 36/0072 |
| 2023/0007542 | A1* | 1/2023 | Teyeb | H04W 36/0016 |

OTHER PUBLICATIONS

3GPP TSG-RAN WG2 Meeting #107bis R2-1913908 (Resubmission of R2-1911410); Title: Discussion on Performing CHO instead of RRE in CHO; Agenda Item: 6.9.3.2; Source: Samsung, Nokia, Nokia Shanghai Bell, Qualcomm Incorporated; WID/SID: NR_Mob_Enh—Release 16; Document for: Discussion and Decision; Date and Location: Sep. 14-18, 2019, Chongqing, China, consisting of 4-pages.
3GPP TSG-RAN WG2 #109-e Tdoc R2-2000330; Title: Major CHO issues not discussed in [108#66][NR Mob]; Agenda Item: 6.9.3.1 Conditional handover—configuration and execution details; Source: Ericsson; Document for: Discussion, Decision; Date and Location: Feb. 24-Mar. 6, 2020, Electronic Meeting, consisting of 8-pages.
3GPP TSG-RAN WG2 #107bis R2-1912636; Title: TP for 38.331 on CHO; Agenda Item: 6.9.3.1 Conditional handover—configuration and execution details; Source: Ericsson; Document for: Discussion and Decision; Date and Location: Oct. 14-18, 2019, Chongqing, China, consisting of 30-pages.
3GPP TSG-RAN WG2 Meeting #107bis R2-1912781; Title: Running CR for the introduction of NR mobility enhancement; Source to WG: Intel Corporation; Source to TSG: R2; Work item code: NR_Mob_enh-Core; Date and Location: Oct. 14-18, 2019, Chongqing, China, consisting of 19-pages.
3GPP TS 37.340 V15.7.0; 3rd Generation Partnership Project; Technical Specification Group Radio Access Network; Evolved Universal Terrestrial Radio Access (E-UTRA) and NR; Multi-connectivity; Stage 2 (Release 15); Sep. 2019, consisting of 70-pages.
3GPP TSG-RAN WG2 #107 R2-1911640; Title: Offline discussion report on 800; Agenda Item: 11.9.3.2; Source: Intel Corporation; Document for: Discussion and decision; Date and Location: Aug. 26-30, 2019 Prague Czech Republic, consisting of 13-pages.

* cited by examiner

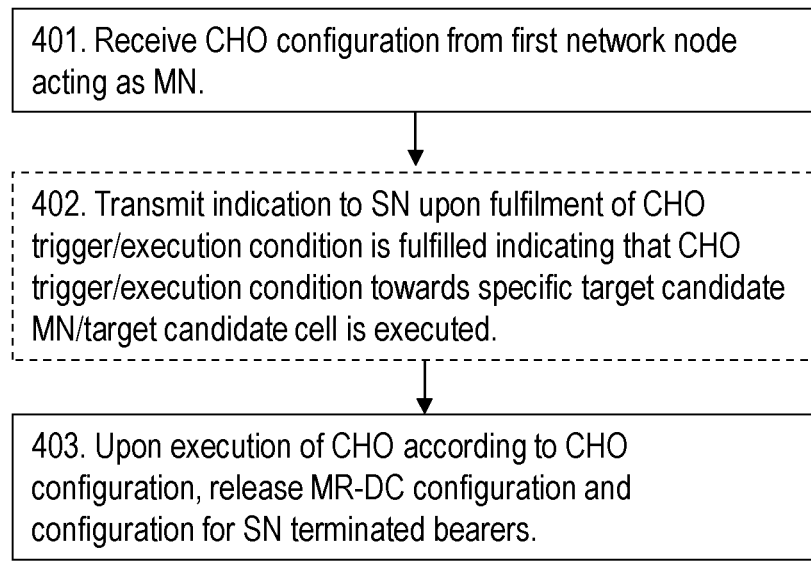
Fig. 4 Method in the UE 120

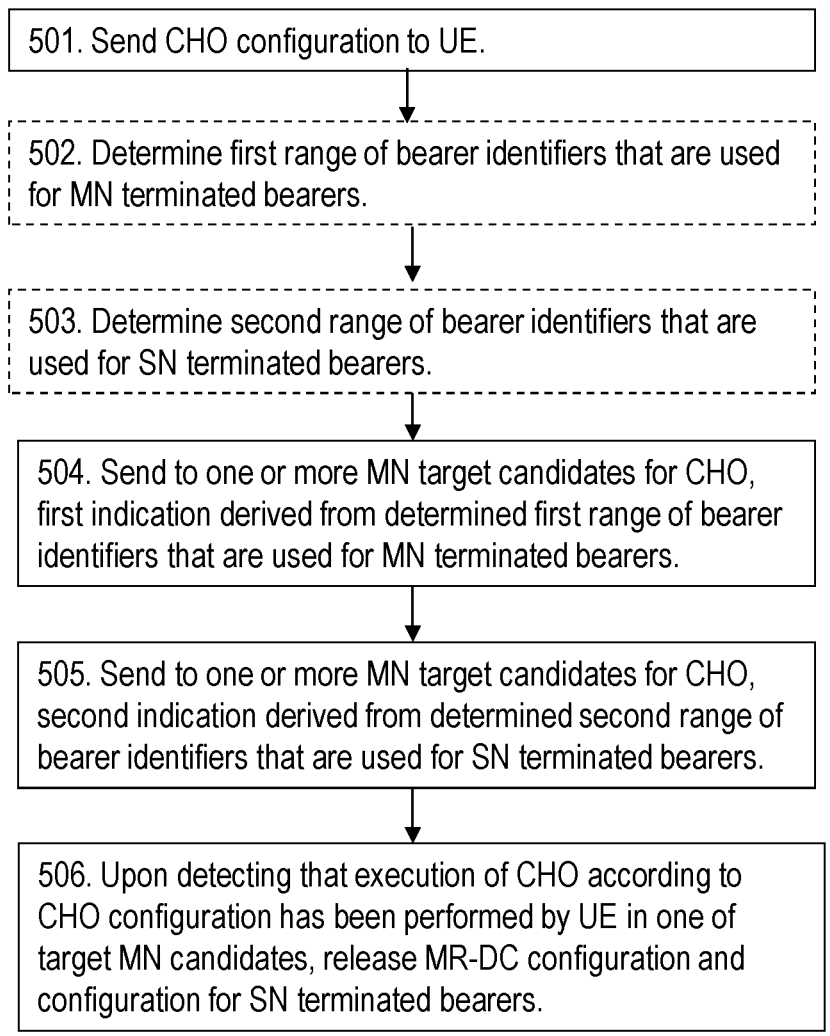
Fig. 5 Method in the first network node 111

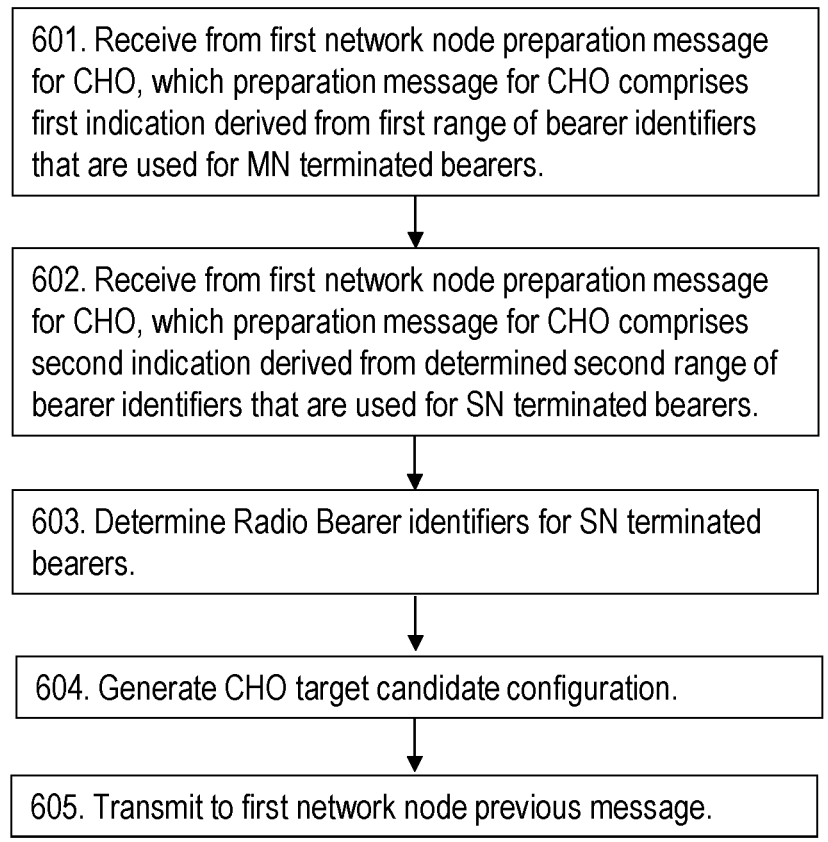
Fig. 6 Method in the second network node 112

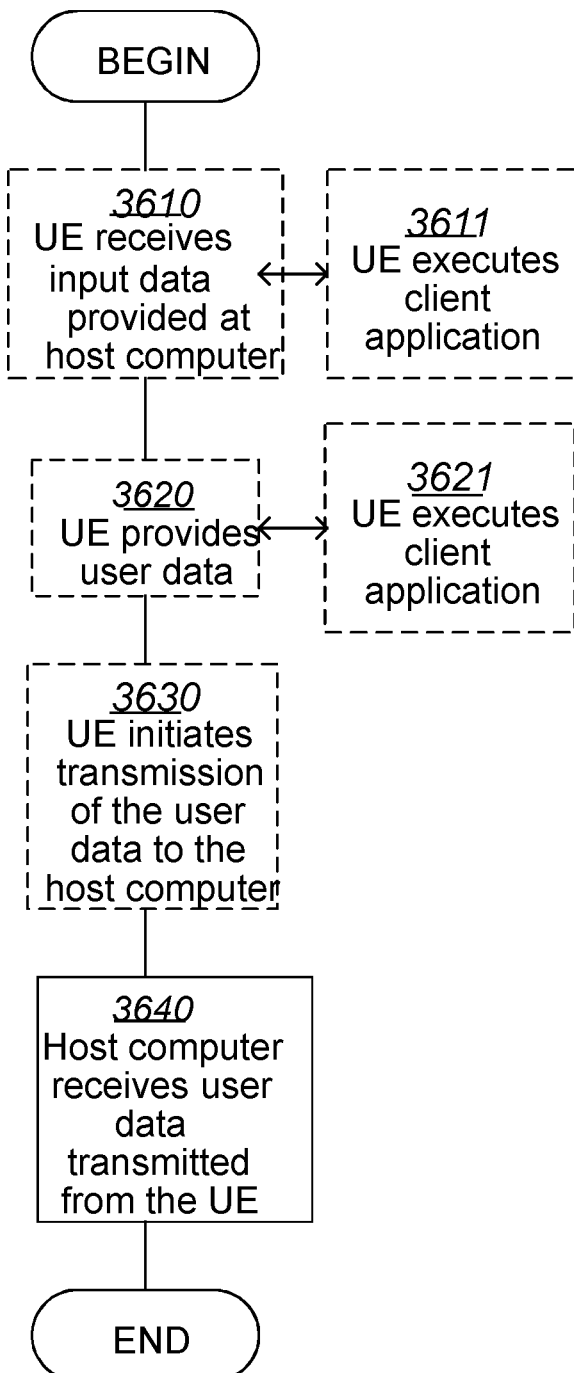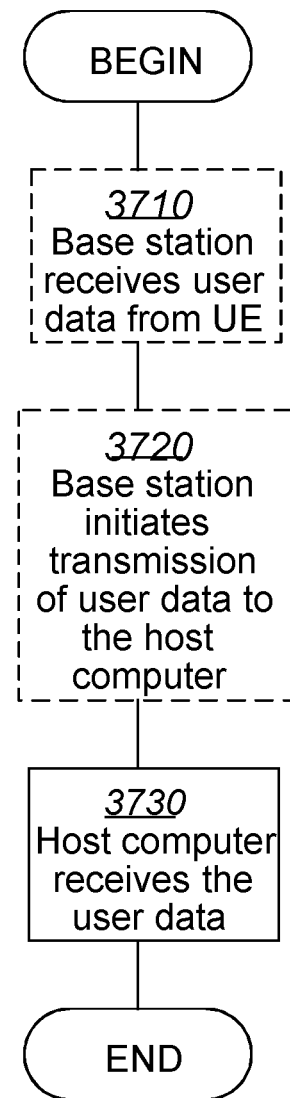
FIG. 15
FIG. 16

CHO IN DC (DUAL CONNECTIVITY)

TECHNICAL FIELD

Embodiments herein relate to a User Equipment (UE), a first network node, a second network node and methods therein. In some aspects, they relate to handling a Conditional Handover (CHO) of the UE from a first cell to a second cell in a wireless communications network.

BACKGROUND

In a typical wireless communication network, wireless devices, also known as wireless communication devices, mobile stations, stations (STA) and/or User Equipments (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio access node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio access node. The radio access node communicates over an air interface operating on radio frequencies with the wireless device within range of the radio access node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio access nodes are directly connected to the EPC core network rather than to RNCs used in 3G networks. In general, in E-UTRAN/LTE the functions of a 3G RNC are distributed between the radio access nodes, e.g. eNodeBs in LTE, and the core network. As such, the RAN of an EPS has an essentially "flat" architecture comprising radio access nodes connected directly to one or more core networks, i.e. they are not connected to RNCs. To compensate for that, the E-UTRAN specification defines a direct interface between the radio access nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

Conditional Handover

In 3GPP NR Release 16, the concept of conditional handover is being considered. The proposed additions to the specifications can be found in e.g. R2-1912781 and R2-1912636 as shown in 3GPP FIG. 9.2.3.x.2-1: Intra-Access and Mobility management Function (AMF)/User Plane Function (UPF) Conditional Handover (HO) which is depicted in FIGS. 1a (Steps 0-7) and 1b (Step 8) and comprises the following steps:

Step 0/1. Same as step 0, 1 in FIG. 9.2.3.2.1-1 of section 9.2.3.2.1.

Step 2. The source gNB decides to use CHO.

Step 3. The source gNB issues a CHO Request message to one or more candidate gNBs.

Editor's note: FFS on the details of CHO Request message, and whether multiple candidate gNBs are allowed. RAN3 scope.

Step 4. Same as step 4 in FIG. 9.2.3.2.1-1 of section 9.2.3.2.1.

Step 5. The candidate gNB, being a candidate for target gNB, sends CHO response including configuration of CHO candidate cell to the source gNB.

Editor's note: For Further Study (FFS) on the details of CHO response message. RAN3 scope.

Step 6. The source gNB sends an RRCReconfiguration message to the UE, containing the configuration of CHO candidate cell(s) and CHO execution condition(s).

Step 7. The UE sends an RRCReconfigurationComplete message to the source gNB.

Step 8. The UE maintains connection with the source gNB after receiving CHO configuration, and starts evaluating the CHO execution conditions for the candidate cell(s). If at least one CHO candidate cell satisfies the corresponding CHO execution condition, the UE detaches from the source gNB, applies the stored corresponding configuration for that selected candidate cell and synchronises to that candidate cell and completes the RRC handover procedure by sending RRCReconfigurationComplete message to target gNB.

Editor's note: FFS how to perform data forwarding, RAN3 scope.

Editor's note: FFS whether the procedure can be combined with 'simultaneous connectivity handover.

RRCReconfiguration
RRCReconfiguration Message

```
-- ASN1START
-- TAG-RRCRECONFIGURATION-START
RRCReconfiguration ::=          SEQUENCE {
    rrc-TransactionIdentifier       RRC-TransactionIdentifier,
    criticalExtensions              CHOICE {
        rrcReconfiguration              RRCReconfiguration-IEs,
        criticalExtensionsFuture        SEQUENCE { }
    }
}
<<Omitted parts>>
RRCReconfiguration-v1560-IEs ::=  SEQUENCE {
    mrdc-SecondaryCellGroupConfig       SetupRelease { MRDC-SecondaryCellGroupConfig }
OPTIONAL,   -- Need M
    radioBearerConfig2                  OCTET STRING (CONTAINING RadioBearerConfig}
```

-continued

```
OPTIONAL,   -- Need M
    sk-Counter                        SK-Counter
OPTIONAL,   -- Need N
    nonCriticalExtension              RRCReconfiguration-v16-IEs
OPTIONAL
}
RRCReconfiguration-v16-IEs ::=   SEQUENCE {
    conditionalReconfiguration        ConditionalReconfiguration
    nonCriticalExtension              SEQUENCE { } OPTIONAL
}
```

ConditionalReconfiguration

The IE ConditionalReconfiguration is used to add, modify or release a conditional handover configuration per target candidate cell.

ConditionalReconfiguration Information Element

```
-- ASN1START
-- TAG-CONDITIONAL-RECONFIG-START
ConditionalReconfiguration ::=   SEQUENCE {
    condReconfigurationToRemoveList      CondReconfigurationToRemoveList
    condReconfigurationToAddModList      CondReconfigurationToAddModList
    ...
}
CondReconfigurationToRemoveList ::=   SEQUENCE (SIZE (1..maxNrofCondReconf)) OF CondReconfigurationId
|
-- TAG-CONDITIONAL-RECONFIG-STOP
-- ASN1STOP
```

ConditionalReconfigurationId

The IE ConditionalReconfigurationId is used to identify a conditional reconfiguration i.e. linking of trigger conditions and an RRCReconfiguration to be applied upon the fulfilment of the conditions.

ConditionalReconfigurationId Information Element

```
-- ASN1START
-- TAG-CONDRECONFIGURATIONID-START
CondReconfigurationId ::=    INTEGER (1.. maxNrofCondReconf)
```

-continued

```
-- TAG-CONDRECONFIGURATIONID-STOP
-- ASN1STOP
```

CondReconfigurationToAddModList

The IE CondReconfigurationToAddModList concerns a list of conditional handover configurations to add or modify, with for each entry the measId (associated to the triggering condition configuration) and the associated RRCReconfiguration.

CondReconfigurationToAddModList Information Element

```
-- ASN1START
-- TAG-CONDRECONFIGURATIONTOADDMODLIST-START
CondReconfigurationToAddModList ::=    SEQUENCE (SIZE (1..maxNrofCondReconf)) OF CondReconfigurationAddMod
CondReconfigurationAddMod ::=    SEQUENCE {
    condReconfigurationID                 CondReconfigurationId,
    condReconfigurationPerTargetCandidate CondReconfigurationPerTargetCandidate
    ...
}
-- TAG-CONDRECONFIGURATIONTOADDMODLIST-START
-- ASN1STOP
```

CondReconfigurationPerTargetCandidate

The IE CondReconfigurationPerTargetCandidate contains a conditional reconfiguration for a target candidate cell including a trigger condition configuration which is a set of pointers to measurement identifiers, each measId with its trigger condition, and an associated RRCReconfiguration in an OCTET STRING to be applied when all conditions associated to the measurement identifiers are fulfilled.

CondReconfigurationPerTargetCandidate
Information Element

```
-- ASN1START
-- TAG-CONDRECONFIGURATIONPERTARGETCANDIDATE-START
CondReconfigurationPerTargetCandidate ::=  SEQUENCE {
     rrcReconfigurationToApply       OCTET STRING (CONTAINING RRCReconfiguration)
        triggerCondition              SEQUENCE (SIZE (1.. maxNrofTriggerCond)) OF MeasId
     ...
}
-- TAG- CONDRECONFIGURATIONPERTARGETCANDIDATE-STOP
-- ASN1STOP
```

The IE ReportConfigNR specifies criteria for triggering of an NR measurement reporting event or of a conditional reconfiguration event. Measurement reporting events and conditional reconfiguration event are based on cell measurement results, which can either be derived based on Synchronization Signal (SS) Physical Broadcast Channel (PBCH) block or CSI-RS. These events are labelled AN with N equal to 1, 2 and so on.

Event A1: Serving becomes better than absolute threshold;

Event A2: Serving becomes worse than absolute threshold;

Event A3: Neighbour becomes amount of offset better than Primary Cell (PCell) and/or Primary SCG Cell (PSCell);

Event A4: Neighbour becomes better than absolute threshold;

Event A5: PCell and/or PSCell becomes worse than absolute threshold1 Neighbour and/or SCell becomes better than another absolute threshold2;

AND Event A6: Neighbour becomes amount of offset better than SCell.

ReportConfigNR Information Element

```
-- ASN1START
-- TAG-REPORTCONFIGNR-START
ReportConfigNR ::=            SEQUENCE {
   reportType                    CHOICE {
     periodical                    PeriodicalReportConfig,
     eventTriggered                EventTriggerConfig,
     ...,
     reportCGI                     ReportCGI,
     [[
     reportSFTD                    ReportSFTD-NR
     ]],
     [[
     condReconfigurationTrigger    CondTriggerConfig,
     ]]
   }
}
ReportCGI ::=                 SEQUENCE {
   cellForWhichToReportCGI       PhysCellId,
   ...
}
ReportSFTD-NR ::              SEQUENCE {
   reportSFTD-Meas               BOOLEAN,
```

```
    reportRSRP                    BOOLEAN,
    ...
}
CondTriggerConfig::=              SEQUENCE {
    eventId                           CHOICE {
        eventA3                           SEQUENCE {
            a3-Offset                         MeasTriggerQuantityOffset,
            timeToTrigger                     TimeToTrigger,
        },
        eventA5                           SEQUENCE {
            a5-Threshold1                     MeasTriggerQuantity,
            a5-Threshold2                     MeasTriggerQuantity,
            timeToTrigger                     TimeToTrigger,
        },
        ...
    },
    rsType                            NR-RS-Type,
    ...
}
```

Master Node to eNB and/or gNB Change

This procedure is triggered for a UE that is operating in Multi-Radio Dual Connectivity (DC), i.e., it has a configured Master Cell Group (MCG) with a Master Node (MN) and a configured Secondary Cell Group (SCG) with a Secondary Node (SN). In that scenario the MN is responsible to monitor neighbour cells of the MCG, e.g. by configuring the UE with A3 events for that frequency, and possibly trigger a mobility procedure, such as reconfiguration with sync) if a better cell is found, which possibly may be in another node that is not the current source MN. In that procedure, as the UE has both an MN and an SN connection, the SN may still be in good conditions and could possibly remain as the SN after the change of MN. Hence, in 3GPP TS 37.340 v15.7.0, procedures for Master node to eNB/gNB change, i.e. handover from dual connectivity to single connectivity in a different node, are specified.

Multi RAT-Dual Connectivity (MR-DC) with 5GC

The MN to ng-eNB and/or gNB Change procedure is used to transfer UE context data from a source MN and/or SN to a target ng-eNB and/or gNB. Both the cases where the source MN and the target node belong to the same RAT (i.e. they are both ng-eNBs or both gNBs) and the cases where the source MN and the target node belong to different RATs are supported. NOTE 0: Inter-system HO from ng-eNB and/or gNB MN to eNB is also supported.

FIGS. 2a (Steps 1-8) and 2b (Step 9a-16) depict 3GPP FIG. 10.8.2-1: MN to ng-eNB/gNB Change procedure, which shows an example signalling flow for the MN to ng-eNB/gNB Change procedure:

Step 1. The source MN starts the MN to ng-eNB and/or gNB Change procedure by initiating the Xn Handover Preparation procedure, including both MCG and SCG configuration. Xn is the interface between ng-eNBs and/or gNBs.

NOTE 1: The source MN may send the SN Modification Request message (to the source SN) to request the current SCG configuration and allow provision of data forwarding related information before step 1.

Step 2. The target ng-eNB and/or gNB include the field in HO command which releases the SCG configuration, and may also provide forwarding addresses to the source MN.

Step 3. If the resource allocation of target ng-eNB and/or gNB was successful, the MN initiates the release of the source SN resources towards the source SN including a Cause indicating MCG mobility. The SN acknowledges the release request. If data forwarding is needed, the MN provides data forwarding addresses to the source SN. Reception of the SN Release Request message triggers the source SN to stop providing user data to the UE.

Step 4. The MN triggers the UE to perform HO and apply the new configuration. Upon receiving the new configuration, the UE releases the entire SCG configuration.

Step 5/6. The UE synchronizes to the target ng-eNB and/or gNB.

Step 7. For SN terminated bearers using RLC AM, the SN sends the SN Status transfer, which the source MN sends then to the target ng-eNB and/or gNB.

Step 8. If applicable, data forwarding from the source SN takes place. It may start as early as the source SN receives the SN Release Request message from the MN.

Step 9a. The source SN sends the Secondary RAT Data Usage Report message to the source MN and includes the data volumes delivered to and received from the UE as described in clause 10.11.2.

NOTE 2: The order the SN sends the Secondary RAT Data Usage Report message and performs data forwarding with MN is not defined. The SN may send the report when the transmission of the related QoS flow is stopped.

Step 9b. The source MN sends the Secondary RAT Report message to AMF to provide information on the used NR and/or E-UTRA resource.

Step 10-14. The target ng-eNB and/or gNB initiate the Path Switch procedure.

Step 15. The target ng-eNB and/or gNB initiate the UE Context Release procedure towards the source MN.

Step 16. Upon reception of the UE Context Release message from MN, the source SN can release radio and C-plane related resource associated to the UE context. Any ongoing data forwarding may continue.

A problem will be identified and discussed under Detailed Description below.

SUMMARY

An object of embodiments herein is to improve the performance of a wireless communications network using handover.

According to an aspect of embodiments herein, the object is achieved by a method performed by a User Equipment, UE, for handling a Conditional Handover, CHO, from a first cell to a second cell in a wireless communications network. The UE is served by a Master Node, MN, in the first cell and by a Secondary Node, SN, in a third cell. The UE receives a CHO configuration from the first network node acting as the MN. The CHO configuration comprises an indication to release configurations of any one or more out of: Multi Radio Access Technology Dual Connectivity, MR-DC, and SN terminated bearers. Upon execution of the CHO according to the CHO configuration, the UE releases the MR-DC configuration and/or a configuration for SN terminated bearers.

According to another aspect of embodiments herein, the object is achieved by a method performed by a first network node for handling a Conditional Handover, CHO, of a User Equipment, UE, from a first cell to a second cell in a wireless communications network. The first network node is operating as a source Master Node for the UE. The UE is configured with Secondary Node, SN, terminated bearers and/or is operating in Multi Radio Access Technology Dual Connectivity, MR-DC served by the source Master Node, MN, in the first cell and by a Secondary Node, SN, in a third cell. The first network node sends a CHO configuration to the UE. The first network node further sends a first indication to one or more MN target candidates for the CHO. The first indication is derived from a determined first range of bearer identifiers that are used for MN terminated bearers. The first network node further sends a second indication to one or more MN target candidates for the CHO. The second indication is derived from a determined second range of bearer identifiers that are used for SN terminated bearers. Upon detecting that execution of the CHO according to the CHO configuration has been performed by a UE in one of the target MN candidates, the first network node releases the MR-DC configuration and/or the configuration for SN terminated bearers.

According to another aspect of embodiments herein, the object is achieved by a method performed by a second network node for handling a Conditional Handover, CHO, of a User Equipment, UE, from a first cell to a second cell in a wireless communications network. The second network node is operating as a target candidate Master Node for the UE. The UE has Secondary Node, SN, terminated bearers and/or is operating in Multi Radio Access Technology Dual Connectivity, MR-DC served by a first network node acting as source Master Node, MN, in the first cell, and by a third network node acting as a Secondary Node, SN, in a third cell.

The second network node receives a preparation message for CHO from the first network node. The preparation message for CHO comprises a first indication derived from a first range of bearer identifiers that are used for MN terminated bearers.

The second network node further receives from the first network node, a preparation message for CHO, which preparation message for CHO comprises a second indication derived from a determined second range of bearer identifiers that are used for SN terminated bearers.

The second network node determines Radio Bearer identifiers for the SN terminated bearers.

The second network node generates a message comprising a CHO target candidate configuration. The configuration comprises at least one of the following: a list of radio bearers to be deleted, and an indication to the UE that the UE shall delete all SN terminated bearers and/or MR-DC configurations;

The second network node transmits the generated message to the first network node, enabling the first network node to configure the UE with CHO configuration, using that message or its content as part of a CHO target configuration.

According to another aspect of embodiments herein, the object is achieved by a User Equipment, UE, configured to handle a Conditional Handover, CHO, from a first cell to a second cell in a wireless communications network. The UE is to be served by a Master Node, MN, in the first cell and by a Secondary Node, SN, in a third cell. the UE being configured to:
  receive a CHO configuration from the first network node acting as the MN, which CHO configuration comprises an indication to release configurations of any one or more out of: Multi Radio Access Technology Dual Connectivity, MR-DC, and SN terminated bearers, and
  upon execution of the CHO according to the CHO configuration, release the MR-DC configuration and/or the configuration for SN terminated bearers.

According to yet another aspect of embodiments herein, the object is achieved by a first network node configured to handle a Conditional Handover, CHO, of a User Equipment, UE, from a first cell to a second cell in a wireless communications network.

The first network node is operable as a source Master Node for the UE. The UE is to be served by the source Master Node, MN, in the first cell and by a Secondary Node, SN, in a third cell. The first network node is configured to:
  send a CHO configuration to the UE, which CHO configuration comprises an indication to release configurations of any one or more out of: Multi Radio Access Technology Dual Connectivity, MR-DC, and SN terminated bearers
  send to one or more MN target candidates for the CHO, a first indication to be derived from a determined first range of bearer identifiers that are used for MN terminated bearers,
  send to one or more MN target candidates for the CHO, a second indication to be derived from a determined second range of bearer identifiers that are used for SN terminated bearers.
  upon detecting that execution of the CHO according to the CHO configuration has been performed by a UE in one of the target MN candidates, release the MR-DC configuration and/or the configuration for SN terminated bearers.

According to yet another aspect of embodiments herein, the object is achieved by a second network node, configured to handle a Conditional Handover, CHO, of a User Equipment, UE, from a first cell to a second cell in a wireless communications network. The second network node is operable as a target candidate Master Node for the UE.

The UE is configured with Secondary Node, SN, terminated bearers and/or is operable in Multi Radio Access Technology Dual Connectivity, MR-DC, to be served by a first network node acting as source Master Node, MN, in the first cell and by a third network node acting as a Secondary Node, SN, in a third cell. The second network node is configured to:
  Receive from the first network node, a preparation message for CHO, which preparation message for CHO is adapted to comprise a first indication derived from a first range of bearer identifiers that are used for MN terminated bearers, receive from the first network node a preparation message for CHO, which preparation message for CHO is adapted to comprises a second indication derived from a determined second range of bearer identifiers that are used for SN terminated bearers, determine Radio Bearer identifiers for SN terminated bearers, generate a message comprising a CHO target candidate configuration, the configuration being adapted to comprise at least one of the following: a list of radio bearers to be deleted; and an indication to the UE that the UE shall delete all SN terminated bearers and/or MR-DC configurations;

transmit the generated message to the first network node, enabling the first network node (111) to configure the UE (120) with CHO configuration, using that message or its content as part of a CHO target configuration.

It is furthermore provided herein a computer program product comprising instructions, which, when executed on at least one processor, cause the at least one processor to carry out any of the methods above, as performed by the user equipment or the radio network node. It is additionally provided herein a computer-readable storage medium, having stored there on a computer program product comprising instructions which, when executed on at least one processor, cause the at least one processor to carry out the method according to any of the methods above, as performed by the radio network node or the user equipment.

BRIEF DESCRIPTION OF THE DRAWINGS

Examples of embodiments herein are described in more detail with reference to attached drawings in which:

FIG. 4 is a flowchart depicting embodiments of a method in a UE.

FIG. 5 is a flowchart depicting embodiments of a method in a first network node.

FIG. 6 is a flowchart depicting embodiments of a method in a second network node.

FIGS. 13-16 are flowcharts illustrating methods implemented in a communication system including a host computer, a base station and a user equipment.

DETAILED DESCRIPTION

As a part of developing embodiments herein the inventors identified a problem which first will be discussed.

Relation Between CHO and Dual Connectivity

In the latest version of 3GPP submitted Text Proposal (see R2-1912636 TP for 38.331 on CHO) it has been assumed that the CHO per target candidate comprises an RRCReconfiguration, but restrictions were not discussed. In 3GPP the relation between CHO procedures and Multi-Radio Dual Connectivity (MR-DC) has not been explicitly discussed. MR-DC may also be referred to as Multi-RAT Dual Connectivity or to Multi-Radio dual connectivity. In other words, the following was not discussed:

If a UE operating in MR-DC may receive a CHO configuration;

If a UE monitoring CHO conditions may be configured to start operating in MR-DC.

A related discussion that is not in the scope of embodiments herein is the support for conditional PSCell addition and conditional PSCell change. In conditional PSCell addition the UE is not operating in MR-DC when it receives a conditional HO like configuration comprising trigger and/or execution conditions and an RRCReconfiguration to be stored and only applied when the associated conditions are fulfilled. In conditional PSCell change the UE is operating in MR-DC when it receives a conditional HO like configuration comprising trigger and/or execution conditions and an RRCReconfiguration to be stored and only applied when the associated conditions are fulfilled.

Problems to be Solved

A first problem some embodiments herein solves has to do with mobility reliability issues in a given area within the network where the UE could also benefit from MR-DC e.g. for traffic aggregation and/or routing. While the UE in MR-DC can receive handover commands, these may fail to be received and/or executed. Or the UE may detect a Radio Link Failure (RLF) while it is operating in MR-DC. There could be areas where the network wants to configure a UE with CHO target candidates to avoid and/or minimize the risk of Radio Link Failure (RLF)s and handover failures (HOFs). At the same time, the network is capable of configuring UEs with Dual Connectivity. The solution for this problem is described below and comprises the UE being configured with MR-DC while monitors CHO, and the UE being configured with CHO while it is operating in MR-DC.

Figure 1A:
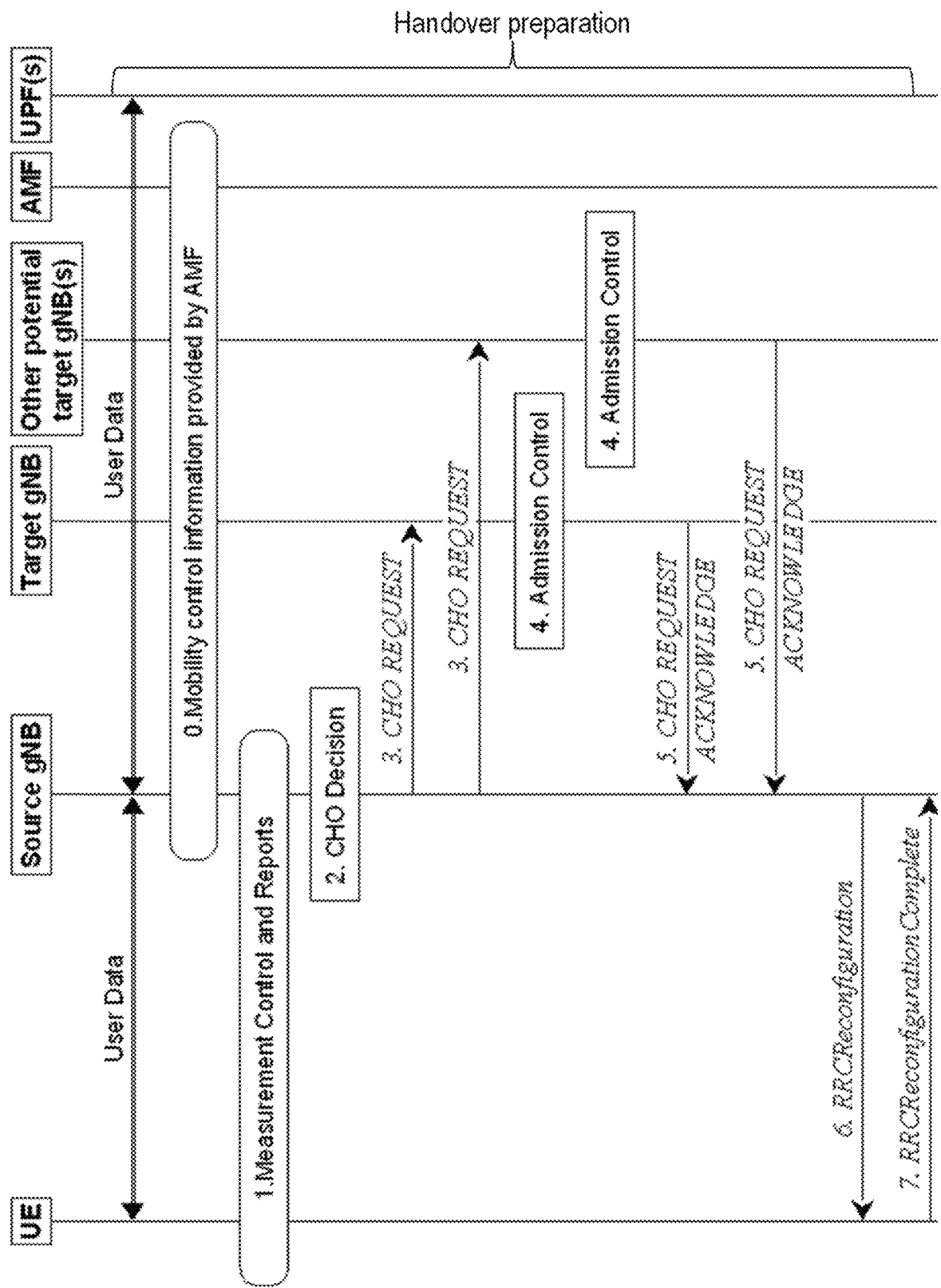
FIGS. 1 *a* and *b* are sequence diagrams illustrating prior art.
Figure 1B:
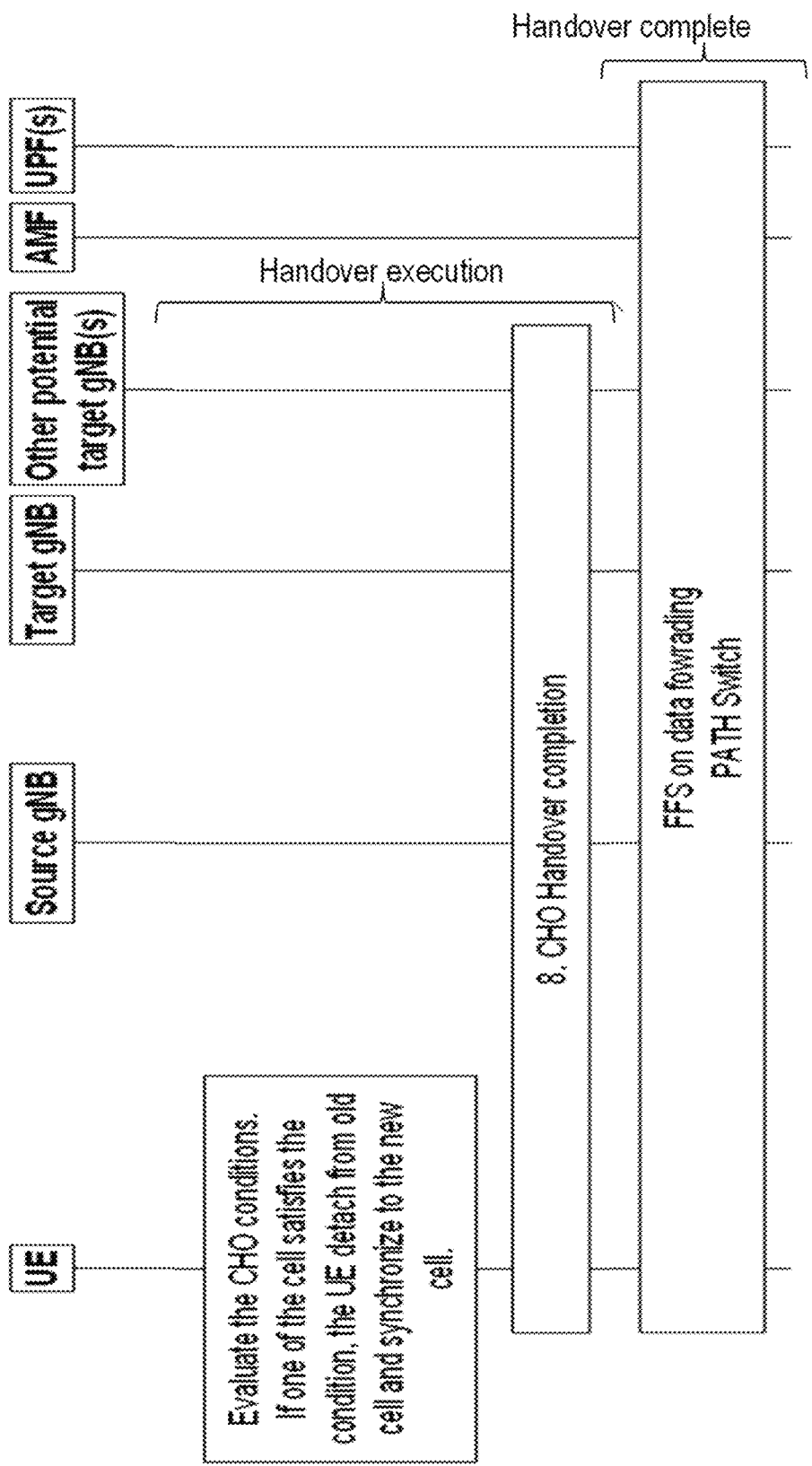
Figure 2A:
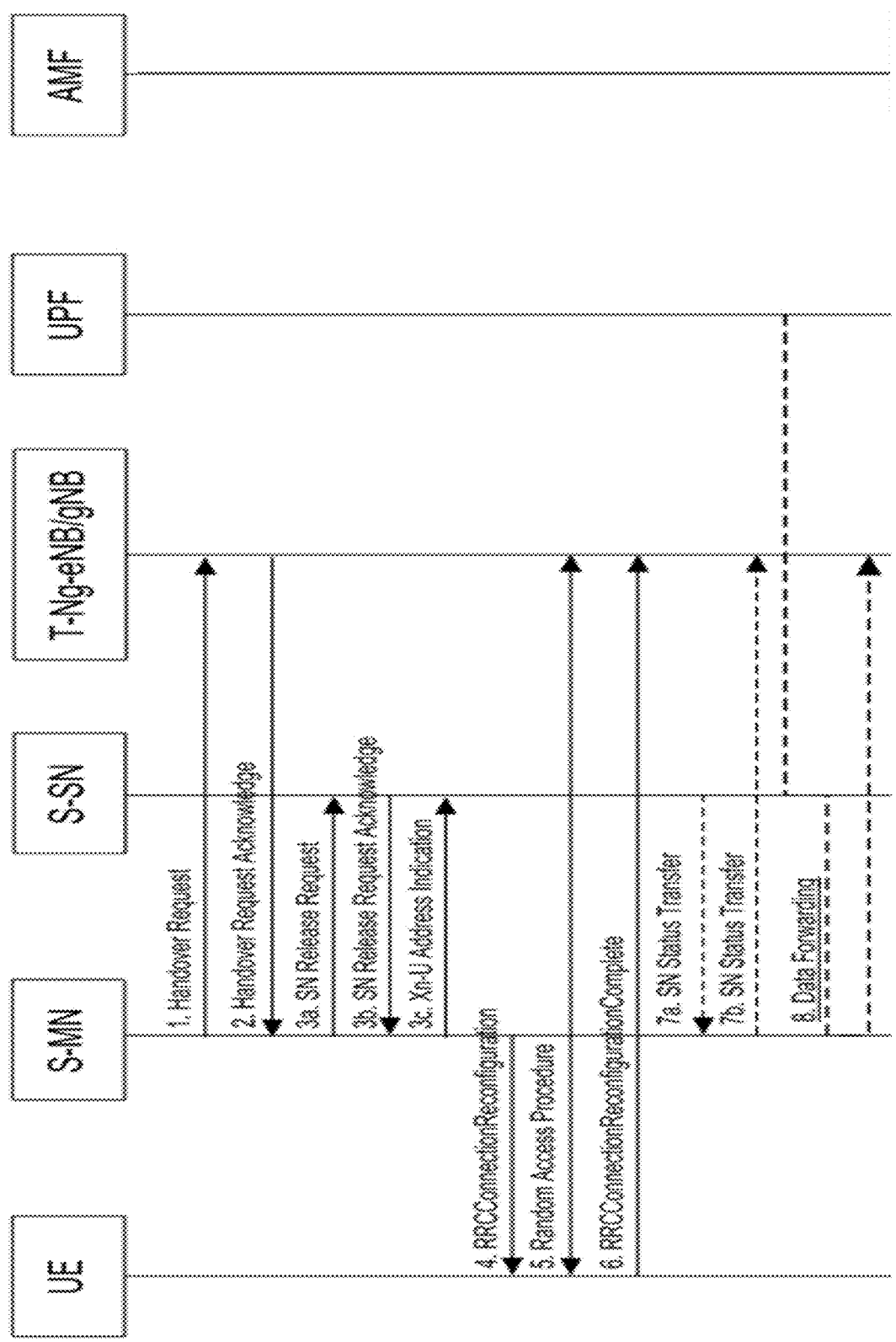
FIGS. 2 *a* and *b* are sequence diagrams illustrating prior art.
Figure 2B:
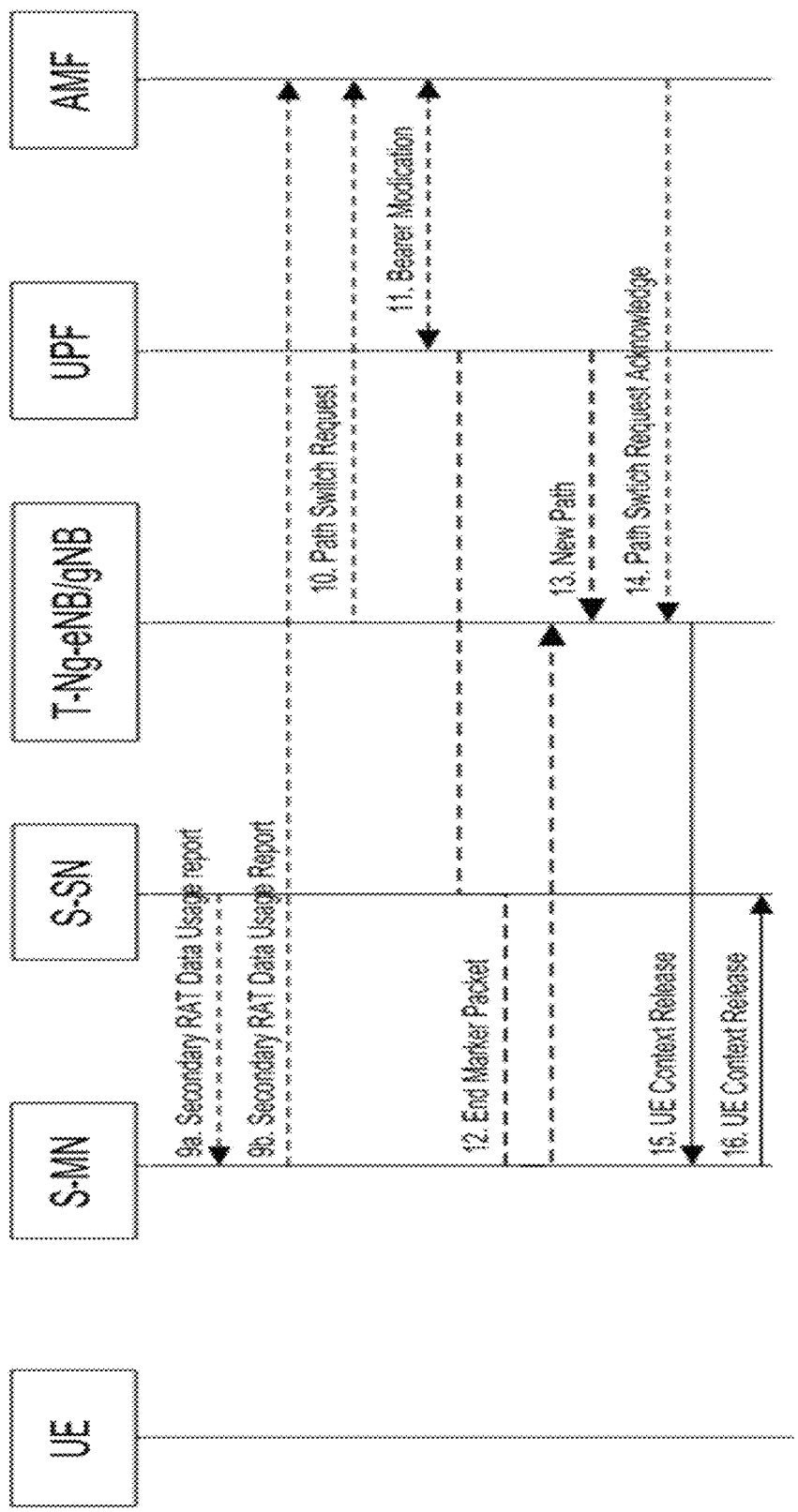
Figure 10A:
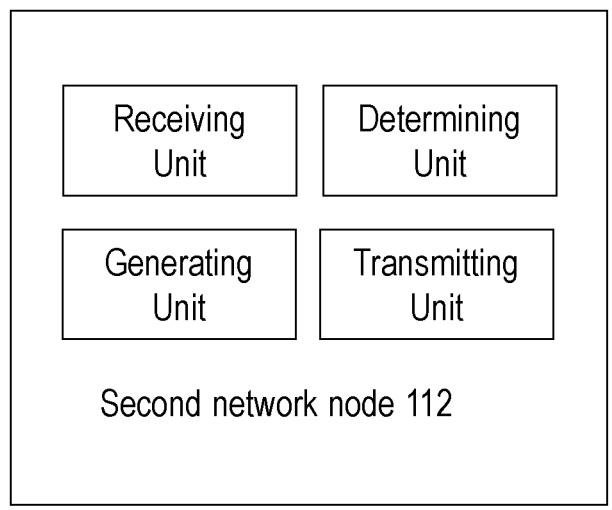
FIGS. 10 *a* and *b* are schematic block diagrams illustrating an embodiment of a second network node.

A second problem relates to a UE being configured with MR-DC while it monitors CHO, or the UE being configured with CHO while it is operating in MR-DC, in particular the handling of SN related configurations such as e.g. SN terminated bearers. In a legacy procedure shown above, an MN decides to trigger a handover for a UE operating in MR-DC and, indicates both MCG and SCG configuration, either NR SCG configuration if the UE is in NR-DC, or E-UTRA SCG configurations if the UE is in NE-DC, to the target MN, e.g., T-gNB according to step 2 in FIG. 10.8.2-1 shown in FIG. 2*a*, *b* above. Hence, if the target MN is not interested to keep the UE in MR-DC after the handover, the target MN includes in the HO command the field mrdc-SecondaryCellGroupConfig and sets it to release, as shown below according to 3GPP TS 38.331:

---

1> if the RRCReconfiguration includes the mrdc-SecondaryCellGroupConfig:
    2> if the mrdc-SecondaryCellGroupConfig is set to setup:
        3> if the mrdc-SecondaryCellGroupConfig includes mrdc-ReleaseAndAdd:
            4> perform MR-DC release as specified in clause

```
5.3.5.10;
    3> if the received mrdc-SecondaryCellGroup is set to nr-SCG:
        4> perform the RRC reconfiguration according to
5.3.5.3    for the RRCReconfiguration message included in nr-SCG;
    3> if the received mrdc-SecondaryCellGroup is set to eutra-SCG:
        4> perform the RRC connection reconfiguration
as specified in TS 36.331 [10], clause 5.3.5.3 for the
RRCConnectionReconfiguration
message included in eutra-SCG;
    2> else (mrdc-SecondaryCellGroupConfig is set to release):
        3> perform MR-DC release as specified in clause 5.3.5.10;
5.3.5.10 MR-DC release
The UE shall:
    1> as a result of MR-DC release triggered by E-UTRA or NR:
        2> release SRB3 (configured according to radioBearerConfig),
if present, as
specified in 5.3.5.6.2;
        2> release measConfig associated with SCG;
        2> if the UE is configured with NR SCG:
            3> release the SCG configuration as specified in clause
5.3.5.4;
        2> else if the UE is configured with E-UTRA SCG:
            3> release the SCG configuration as specified in TS 36.331,
            clause 5.3.10.19 to release the E-UTRA SCG;
``` according to the previous procedure) in this case it is not interested to continue with MR-DC. That release and/or deletion is not controlled by the field mrdc-SecondaryCell-Grouponfig, but network could remove SN terminates bearers explicitly using the release lists, as shown below:

```
RadioBearerConfig ::=    SEQUENCE {
[...]
    drb-ToReleaseList       DRB-ToReleaseList
OPTIONAL,   -- Need N
[...]
    ...
}
```

In legacy handovers when UE is operating in MR-DC the target MN needs to know which are the SN-terminated bearers that are to be explicitly deleted i.e. what would be the identifiers (IDs) to be indicted to the UE in the drb-ToRelease List. A solution for this in legacy handover has been proposed in a 3GPP CR to 38.331 R2-1913611 Exchanging used IDs of SN terminated ORBs, where it is proposed that in Handover preparation the source gNB

```
RRCReconfiguration-v1560-IEs ::=  SEQUENCE {
    mrdc-SecondaryCellGroupConfig    SetupRelease { MRDC-SecondaryCellGroupConfig}
OPTIONAL,   -- Need M
    radioBearerConfig2               OCTET STRING (CONTAINING RadioBearerConfig)
OPTIONAL,   -- Need M
    sk-Counter                       SK-Counter OPTIONAL,        -- Need N
    nonCriticalExtension             SEQUENCE { }                OPTIONAL
}
```

The target MN should also release the SN terminated radio bearers (e.g. SN terminated DRBs, as in Rel-15 there are no SN terminated SRBs except SRB3 which is release indicates to the target gNB the SN terminated bearer IDs in case the source RB-SN-Config is not included, as shown below:

```
HandoverPreparationInformation-IEs ::= SEQUENCE {
    ue-CapabilityRAT-List            UE-CapabilityRAT-ContainerList,
    sourceConfig                     AS-Config
OPTIONAL, -- Cond HO
    rrm-Config                       RRM-Config
OPTIONAL,
    as-Context                       AS-Context
OPTIONAL,
    nonCriticalExtension             SEQUENCE { }
OPTIONAL
}
AS-Config ::=                        SEQUENCE {
    rrcReconfiguration               OCTET STRING (CONTAINING RRCReconfiguration),
    ...,
    [[
    sourceRB-SN-Config               OCTET STRING (CONTAINING RadioBearerConfig)
OPTIONAL,
    sourceSCG-NR-Config              OCTET STRING (CONTAINING RRCReconfiguration)
OPTIONAL,
    sourceSCG-EUTRA-Config           OCTET STRING
OPTIONAL
    ]],
    [[
    sourceSNTerminatedDRBIDList      SEQUENCE (SIZE (1..maxDRB)) OF DRB-Identity
OPTIONAL
    ]]
}
```

| AS-Config field descriptions |
|---|
| ...
sourceSNTerminatedDRBIDList
This field provides the DRB ID(s) applied for the SN terminated bearers in source SN in case of NE-DC.
The field is included only if sourceRB-SN-Config is not included |

In either of these two cases, sourceRB-SN-Config or the list of SN terminated bearers being used may be obtained by the source MN before the handover preparation procedure. However, as the MN can provide the SN with a list of allowed DRB IDs in e.g. the S-NODE MODIFICATION REQUEST as specified in 3GPP TS 38.423 (v15.5.0) with the field Additional DRB IDs from which the SN can add and/or remove SN terminated bearers without notifying the MN i.e. the source MN may have informed the target MN the UE's configuration that is not up to date according to possibly added and/or removed bearers by the SN. When the source MN decides to handover, it could request the SN for the latest SN configurations and at then provide the UE with the latest configurations or the list of SN terminated bearers being used. However, when a source MN is performing a CHO preparation towards a candidate target MN, the source MN may not be aware of the SN terminated bearers at the UE.

When the UE is configured with MR-DC while monitors CHO, or the UE being configured with CHO while it is operating in MR-DC, the handling of SN related configurations upon CHO execution (e.g. SN terminated bearers) becomes an issue. When a UE receives a conditional handover (CHO) configuration, comprising trigger and/or execution conditions whose configuration is a list of one or multiple measurement identities and an RRCReconfiguration in an OCTET STRING, the UE monitors the trigger and/or execution conditions until at least one of them are fulfilled, and the configurations are executed, or until the network instructs the UE to stop monitoring the configurations, e.g. due to CHO cancellation, normal handover, or release to RRC_IDLE or suspension to RRC_INACTIVE. This means that in some scenarios, the UE will keep monitoring the CHO conditions for a very long time before executing any of them.

If the UE is configured with MR-DC, e.g. E-UTRA NR Dual Connectivity with E-UTRA connected to EPC EN-DC, NR-NR Dual Connectivity, NR-DC, NR E-UTRA Dual Connectivity, NE-DC, E-UTRA NR Dual Connectivity with E-UTRA connected to 5GC, NGEN-DC, the secondary node (SN) may reconfigure the SN terminated bearers and the SCG without informing the MN.

If a UE in MR-DC receives a CHO configuration for at least one target candidate cell in at least one candidate target node, the RRCReconfiguration in the OCTET STRING prepared by each target candidate node should be based on the current UE configuration being used in source cell. If the SN decides to modify the SN and/or SCG configurations after the UE has received the CHO command, but before the UE has executed the CHO, the candidate target node will not have the latest SN and/or SCG configurations and the previous CHO command may not be accurate anymore.

If there are SN terminated bearers which are added after the CHO command is provided to the UE, the candidate node will not be aware of these and any packet buffered for these bearers would be lost.

An object of embodiments herein is to improve the performance of a wireless communications network using handover.

Embodiments herein relate to CHO in such as e.g. related to Mobility; Dual Connectivity; Conditional Handover; RRC;

Some embodiments herein relate to CHO when the UE is configured with MR-DC.

Some advantages of embodiments provided herein may comprise.

Without embodiments herein, the network would have to release the dual connectivity before providing the UE with a conditional handover configuration to avoid any reconfiguration error.

Disclaimers: Embodiments herein describe scenarios where a UE is configured with dual connectivity when it receives a conditional handover configuration for the MCG. The embodiments described herein are focused on NR-DC, i.e. when both master and secondary node are NR gNBs, but embodiments herein are equally applicable to other DC scenarios such as e.g. (EN)-DC, (NG)EN-DC and LTE DC.

Figure 3:
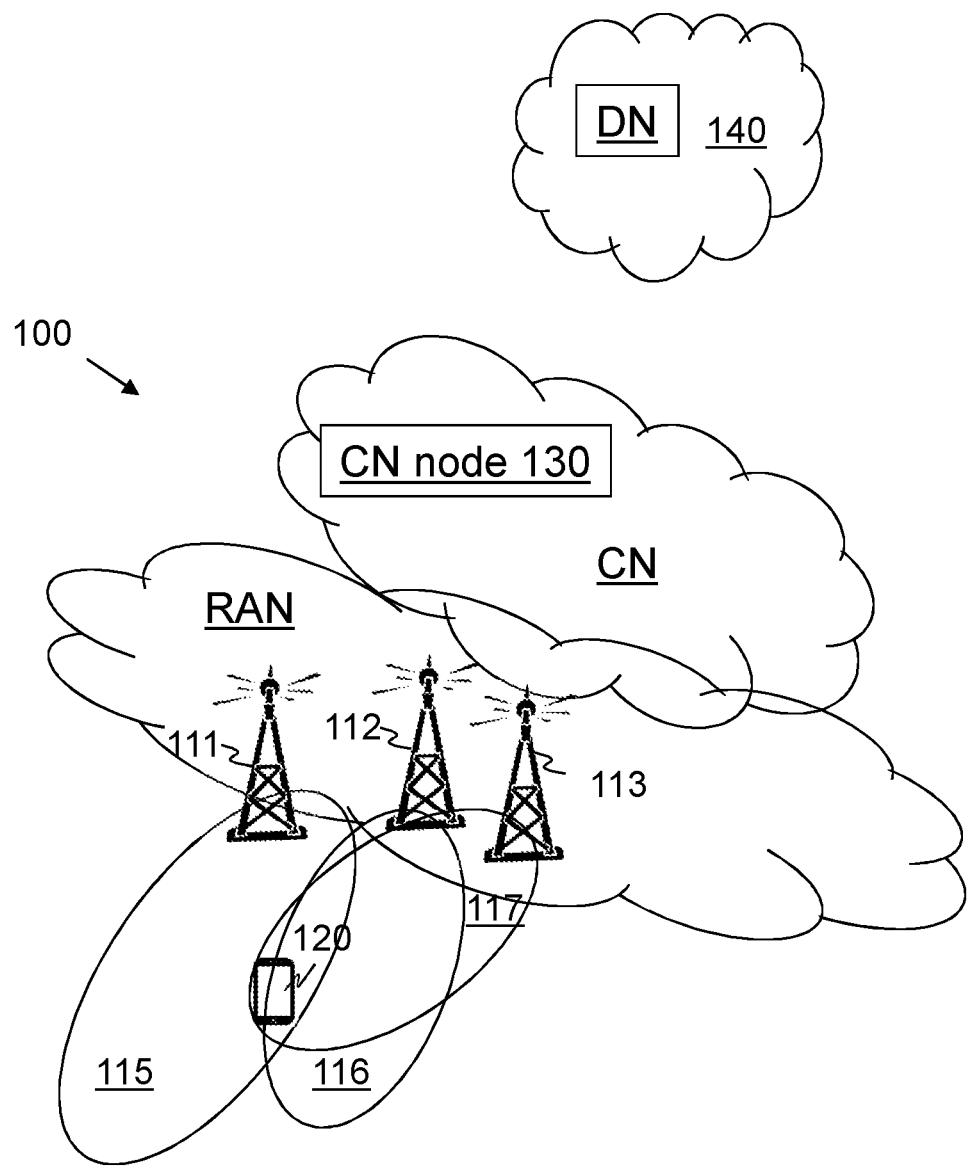
FIG. 3 is a schematic block diagram illustrating embodiments of a wireless communications network

Embodiments herein relate to wireless communication networks in general. FIG. 3 is a schematic overview depicting a wireless communications network 100 wherein embodiments herein may be implemented. The wireless communications network 100 comprises one or more RANs and one or more CNs. The wireless communications network 100 may use a number of different technologies, such as Wi-Fi, Long Term Evolution (LTE), LTE-Advanced, 5G, New Radio (NR), Wideband Code Division Multiple Access (WCDMA), Global System for Mobile communications and/or enhanced Data rate for GSM Evolution (GSM and/or EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

Network nodes operate in the wireless communications network 100 such as a first network node 111 acting as a source MN, a second network node 112 acting as a target candidate MN, and a third network node 113 acting as an SN. The first network node 111 may be referred to as a source MN 111 and the third network node 113 may be referred to as SN 113. The first, second and third network nodes 111, 112, 113 each provides radio coverage over a geographical area, referred to as cells. The first network node 111 provides a first cell 115, the second network node 112 provides a second cell 115 and the third network node 113 provides a third cell 117. The first second and third network nodes 111, 112, 113 may each be a NR-RAN node, transmission and reception point e.g. a base station, a radio access node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the respective first second and third network nodes 111, 112, 113, depending e.g. on the first radio access technology and terminology used. The respective so first second and third network nodes 111, 112, 113 may communicate with a UE with Downlink (DL) transmissions to the UE and Uplink (UL) transmissions from the UE. According to an example scenario of embodiments herein, a UE 120 is preparing a handover from the first cell (115 to the second cell 116.

A number of UEs operate in the wireless communication network 100, such as the UE 120. The UE 120 may be a mobile station, a non-access point (non-AP) STA, a STA, a user equipment and/or a wireless terminals, that communicate via one or more Access Networks (AN), e.g. RAN, e.g. via the source and/or target network nodes 111, 112 to one or more core networks (CN), e.g. comprising CN node 130. It should be understood by the skilled in the art that "UE" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Methods herein may in an aspect be performed by a network node such as the first network node 111 or the second network node 112, and in a second aspect by the UE 120. As an alternative, a Distributed Node (DN) and functionality, e.g. comprised in a cloud 140 as shown in FIG. 3, may be used for performing or partly performing the methods.

FIG. 4 shows an example method performed by the UE 120 for handling a CHO from a first cell 115 to a second cell 116 in a wireless communications network 100. The UE 120 served by a Master Node (MN) 111 in the first cell 115 and by a Secondary Node (SN) 113 in a third cell 117. The MN 111 is also referred to as the first network node 111, and the source MN 111 herein. The UE 120 e.g. has Secondary Node (SN) terminated bearers and/or is operating in Multi Radio Access Technology Dual Connectivity (MR-DC). In other words, the UE 120 may be configured with SN terminated bearers and/or MR-DC.

The method comprises one or more of the following actions, which actions may be taken in any suitable order:
Action 401
The UE 120 receives a CHO configuration from the first network node 111 acting as the MN. The CHO configuration comprises an indication e.g. a flag, to release configurations of any one or more out of: MR-DC and SN terminated bearers.

The receiving of the CHO configuration may e.g. comprise any one out of:
  Receiving a CHO configuration while the UE 120 is operating in MR-DC and/or is configured with SN terminated bearers,
  receiving configurations for SN terminated bearers and/or MR-DC configurations, e.g. a configuration to start operating in MR-DC, like an RRCReconfiguration message upon which the UE performs PSCell addition, while the UE 120 is monitoring CHO, or
  receiving MR-DC configurations and/or configurations for SN terminated bearers and CHO in the same message, e.g. an RRCReconfiguration message.

Action 402
The UE 120 may transmit an indication to the node acting as an SN 113, upon fulfilment of CHO trigger and/or execution condition. The indication indicates that CHO trigger and/or execution condition towards a specific target candidate MN, such as the second network node 112, and/or target candidate cell is executed.

Action 403
Upon execution of the CHO according to the CHO configuration, the UE 120 releases the MR-DC configuration and/or the configuration for SN terminated bearers. This may e.g. mean upon the fulfillment of a trigger and/or execution conditions associated to a CHO configuration.

It may be implied that the UE 120 monitors the quality of the configured CHO cells to see if any of them fulfil the condition. If one of them fulfils this, the UE 120 may execute the CHO for that cell.

According to some embodiments any one or more out of:
The MR-DC configuration may comprise at least one of the following configurations: SCG configuration; and Measurement configurations e.g. measConfig associated with a Secondary Cell Group (SCG), and
the SN-terminated Radio Bearers configuration may comprise any one out of: an SN terminated bearer associated to a logical channel that is associated to a Master Cell Group (MCG); or an SN terminated bearer associated to a logical channel that is associated to an SCG.

The releasing of MR-DC configurations and configurations for SN terminated bearers upon the CHO execution may be performed as an autonomous UE action: When the UE 120 is any one or more out of: operating in MR-DC, has SN terminated bearer, has stored MR-DC configurations, and has SN terminated bearer configurations.

The releasing of the MR-DC configurations and configurations for SN terminated bearers upon the CHO execution may be performed when a Radio Resource Control configuration (RRCReconfiguration) to be applied upon CHO execution includes an indication to release MR-DC configurations. This may e.g. be a message prepared by target and stored at the UE 120.

Thanks to that the UE 120 can continue to be configured with MR-DC and/or SN terminated bearers until the UE executes the CHO even if the first network node 111 or the secondary network node 113 modifies the MR-DC and or SN terminated bearer configuration after the UE 120 has been configured with CHO configurations. If the MR-DC and/or SN terminated bearers configurations were not released upon executing the CHO, there may be a mismatch between the configurations which the CHO configurations are based on and the configurations the UE has when executing the CHO which may cause reconfiguration errors and/or packet loss. Thus, the network does not need to release the dual connectivity before providing the UE 120 with a CHO configuration and thereby any reconfiguration errors or packet losses are avoided.

FIG. 5 shows an example method performed by the first network node 111 for handling a CHO of the UE 120 from the first cell 115 to the second cell 116 in the wireless communications network 100. The first network node 111 is operating as a source MN for the UE 120. The UE 120 e.g. has SN terminated bearers and/or is operating in MR-DC served by the source MN 111 in the first cell 115 and by a SN 113 in the third cell 117.

The method comprises one or more of the following actions performed in any suitable order:
In Action 501, the first network node 111 sends a CHO configuration to the UE 120. The CHO configuration comprises an indication, e.g. a flag, to release configurations of any one or more out of: MR-DC and SN terminated bearers.

The sending of the CHO configuration may comprises any one out of:

Sending a CHO configuration while the UE 120 is operating in MR-DC and/or is configured with SN terminated bearers, sending configurations for SN terminated bearers and/or MR-DC configurations, e.g. a configuration to start operating in MR-DC, like an RRCReconfiguration message upon which the UE performs PSCell addition, while the UE (120) is monitoring CHO, or sending MR-DC configurations and/or configurations for SN terminated bearers and CHO in the same message, e.g. an RRCReconfiguration message.

In some embodiments, any one or more out of:

The MR-DC configuration comprises at least one of the following configurations: SCG configuration; and Measurement configurations e.g. measConfig associated with an SCG, and the SN-terminated Radio Bearers configuration comprise any one out of: an SN terminated bearer associated to a logical channel that is associated to an MCG; or an SN terminated bearer associated to a logical channel that is associated to an SCG;

In Action 502, the first network node 111 may determine, a first range of bearer identifiers that are used for MN terminated bearers. This is to distinguish which bearer identifiers which will only be used by the MN. A first range of bearer identifiers when used herein means a set of data radio bearer identifiers indicating the Data Radio Bearers (DRBs) to be used as MN terminated bearers. This may be indicated by a list of MN bearer identifiers or indicated by a start and end value of the bearer identifier values or indicated by a start and a width value of the bearer identifier values or indicated by a single value, implying any bearer identifier value up to, including or excluding the value are defined as MN bearer identifier. The bearer identifier may e.g. refer to the information element DRB-Identity.

In Action 503, the first network node 111 may determine, a second range of bearer identifiers that are used for SN terminated bearers.

This is to distinguish which bearer identifiers which will only be used by the SN. A second range of bearer identifiers when used herein means a set of data radio bearer identifiers indicating the data radio bearers, DRBs, to be used as SN terminated bearers This may be indicated by a list of SN bearer identifiers or indicated by a start and end value of the bearer identifier values or indicated by a start and a width value of the bearer identifier values or indicated by a single value, implying any bearer identifier value up to, including or excluding the value are defined as SN bearer identifier. The bearer identifier may e.g. refer to the information element DRB-Identity.

In Action 504, the first network node 111 sends a first indication to one or more MN target candidates for the CHO. The first indication is derived from the determined first range of bearer identifiers that are used for MN terminated bearers, e.g. in a preparation message for CHO. The first indication indicates that the UE 120 is configured with MN terminated bearers identified by the first range of bearer identifiers which may be maintained or reconfigured in the target MN.

In Action 505, the first network node 111 sends a second indication to one or more MN target candidates for the CHO. The second indication is derived from a determined second range of bearer identifiers that are used for SN terminated bearers, e.g. in a preparation message for CHO. The second indication indicates that the UE 120 may be configured with a set of SN terminated bearers identified by the second range of bearer identifiers and the second network node 112 can retrieve the pending data from the SN 113 for the SN terminated bearers.

In Action 506, upon detecting that execution of the CHO according to the CHO configuration has been performed by a UE 120 in one of the target MN candidates, e.g. the second network node 112, the first network node 111 releases the MR-DC configuration and/or the configuration for SN terminated bearers.

This may e.g. be upon the reception of a message from the target candidate MN 112, where the UE 120 has sent an RRCReconfigurationComplete related to this action of releasing of MR-DC and SN terminated bearer configurations. The release may be done by sending a message to the Secondary node (old SN). In some embodiments, upon releasing the MR-DC configurations, the first network node 111 provides the Secondary Node 113 with data forwarding information and the Secondary Node 113 may provide any updated SN configuration to the MN 111. The MN 111 may then forward this updated SN information to the target MN candidate node 112 after triggering of the CHO.

In this way, the network does not need to release the dual connectivity before providing the UE 120 with a CHO configuration and thereby any reconfiguration errors or packet losses are avoided.

FIG. 6 shows an example method performed by the second network node 112, e.g. for handling a CHO of the UE 120 from the first cell 115 to the second cell 116 in the wireless communications network 100. The second network node 112 is operating as a target candidate MN for the UE 120. The UE 120, is configured with SN terminated bearers and/or is operating in MR-DC, is served by a first network node 111 acting as source MN in the first cell 115 and by a third network node 111 acting as a SN 113 in a third cell 117.

The method comprises one or more of the following actions performed in any suitable order:

In Action 601, the second network node 112 receives a preparation message for CHO from the first network node 111. The preparation message for CHO comprises a first indication derived from a first range of bearer identifiers that are used for MN terminated bearers. The first range of bearer identifiers that are used for MN terminated bearers will be used by the second network node 112 to determine which data radio bearers it can configure for the UE 120.

In Action 602, the second network node 112 receives a preparation message for CHO from the first network node 111. The preparation message for CHO comprises a second indication derived from a determined second range of bearer identifiers that are used for SN terminated bearers. The second range of bearer identifiers that are used for SN terminated bearers will be used by the second network node 112 to determine which data SN terminated radio bearers the UE 120 was previously configured with prior to executing the CHO so that the second network node 112 does not attempt to add new MN terminated bearers with a bearer identity from the second range before that bearer has been released.

In Action 603, the second network node 112 determines Radio Bearer identifiers for SN terminated bearers. The radio bearer identifiers for SN terminated bearers are determined based on a set of data radio bearer identifiers, e.g. a list of DRB-Identities, a start and end value of DRB-Identities, a start and width value of the DRB-Identities, a start value of DRB-Identities implying that any value above including or excluding the value may be considered as part of the second range of bearer identities. This will be used to indicate which data radio bearer identities are configured as SN terminated bearers prior to the execution of the CHO so that the second network node 112 does not add new MN terminated data radio bearers with radio bearer identities which are configured for SN terminated bearers.

In Action 604, the second network node 112 generates a CHO target candidate configuration. This may e.g. be an RRCReconfiguration message to be applied upon the execution of a trigger and/or execution condition, possibly configured by the source MN. The configuration comprising at least one of the following: a list of radio bearers to be deleted e.g. in the DRBs remove list and/or SRBs remove list; and an indication to the UE 120 that the UE 120 shall delete all SN terminated bearers and/or MR-DC configurations.

In Action 605, the second network node 112 transmits the generated message to the first network node 111, enabling the first network node 111 to configure the UE 120 with CHO configuration, using that message or its content as part of a CHO target configuration.

In this way, the network does not need to release the dual connectivity before providing the UE 120 with a CHO configuration and thereby any reconfiguration errors or packet losses are avoided.

The embodiments described above will now be explained and exemplified more in detail. The embodiments above may be combined with any suitable example or embodiment below.

Embodiments herein describe methods to enable CHOs for UEs such as the UE 120, configured with DC to avoid reconfiguration errors or packet losses.

An example of the method executed at a wireless terminal, also referred to as the UE 120 comprises:

Receiving 401 a CHO configuration while the UE 120 is operating in MR-DC and/or is configured with SN terminated bearers; or Receiving 401 configurations for SN terminated bearers and/or MR-DC configurations, e.g. a configuration to start operating in MR-DC, like an RRCReconfiguration message upon which the UE 120 performs PSCell addition, while it is monitoring CHO; or Receiving 401 MR-DC configurations and/or configurations for SN terminated bearers and CHO in the same message e.g. an RRCReconfiguration message;

Transmitting 402 an indication to the SN such as the third network node 113 acting as an SN, e.g. via SRB3 if configured, or via an SRB1 terminated in the SCG if configured or via lower layer signaling like a Uplink Control Information, or MAC CE, upon the fulfilment of CHO trigger and/or execution condition is fulfilled indicating that CHO trigger and/or execution condition towards a specific target candidate MN and/or target candidate cell is executed. Note: This is an in optional embodiment, and does not have to exist for the sake of embodiments herein. It could be seen as an additional option.

In one dependent embodiment this is only indicated when the procedure is successful;

In another dependent embodiment this is indicated when the procedure is performed;

In another dependent embodiment the UE 120 receives a response message from the SN confirming the reception of the indication;

In another dependent embodiment the UE 120 suspends the operation of SN terminated bearers and any operation towards the SCG such as MN terminated bearers associated with the SCG, measurement configurations associated to the SCG and/or the SN, etc.

At the network side, upon reception of that indication from the UE 120 the SN may stop the transmission of data associated to SN terminated bearers;

At the network side, upon reception of that indication from the UE 120 the SN may indicate that event (i.e. CHO execution leading to suspension of SN operation) to the source MN, e.g. so the MN can stop forwarding data via MN terminated bearers associated to the SCG, e.g., MN terminated DL split RBs.

Releasing 403 MR-DC configurations and configurations for SN terminated bearers upon the CHO execution e.g. upon the fulfilment of a trigger and/or execution conditions associated to a CHO configuration. Related to this action of releasing MR-DC configurations, there could be different dependent embodiments:

MR-DC configurations may comprise at least one of the following configurations:

SCG configuration;

Measurement configurations (measConfig) associated with SCG;

SN-terminated Radio Bearers configurations;

This may be an SN terminated bearer associated to a logical channel that is associated to an MCG;

This may be an SN terminated bearer associated to a logical channel that is associated to an SCG;

In a dependent embodiment, the UE 120 performs this release of MR-DC configurations and the release of SN terminated bearer configurations upon CHO execution as an autonomous UE 120 action, if the UE 120 is operating in MR-DC and/or has SN terminated bearer and has stored MR-DC configurations has SN terminated bearer configurations i.e. the network does not need to contain any explicitly indication to indicate that the UE 120 shall do that. For identifying the SN terminated bearers the UE 120 checks the bearers whose configuration is set to use secondary security keys (i.e. the DRBs with the field keyToUse set to secondary).

In a dependent embodiment, the UE 120 performs this release of MR-DC configurations upon CHO execution if the RRCReconfiguration to be applied upon CHO execution (i.e. the message prepared by target and stored at the UE 120) includes an indication to release MR-DC configurations; Further dependent embodiments could be at least one of the following:

The indication may be a field (e.g. encoded in a SetupRelease structure, possibly set to Release). Upon reception the UE 120 releases at least one of the MR-DC configurations i.e.: SN-terminated Radio Bearers configurations and/or SCG configuration and/or Measurement configurations (measConfig) associated with SCG.

The indication may be a list structure indicating to the UE 120 which bearers are to be reconfigured from SN terminated to MN terminated. The structure can be a drb-ToAddModList of IE DRB-ToAddModList, whose indexes are the ones the target candidate MN determines shall be configured in the target. If any of the indicated DRB identities were configured as SN terminated bearers in the source SN, these will be reconfigured to MN terminated bearers, with the field keyToUse set to master.

The indication may be a list indicating to the UE 120 which bearers are to be removed i.e. the SN terminated bearers. The structure can be a drb-ToReleaseList of IE DRB-ToReleaseList whose indexes are at least the ones the target candidate MN determines to be potentially associated to SN terminated bearers.

The way the target candidate MN determines these bearers to be deleted (and consequently sets the bearer identifiers in the remove list) is part of the method executed on the network side, more precisely in a network node operating as the MN, the method being described afterwards in this document.

Upon reception of a list of SN terminated bearers from the source MN; Then, it knows the identifiers SN terminated Radio Bearers (RBs). These are the ones to be included in the remove list and the ones the UE 120 removes upon CHO execution;

Upon reception of the UE 120's configuration by MN upon CHO preparation, containing the UE 120's MN terminated RBs and SN terminated RBs. However, as the SN may have updated these e.g. by adding or removing SN terminated bearers without indicating the MN, what a target candidate MN receives may not be the most up to date list of SN terminates bearers. Hence, the target MN candidate identifies the MN terminates bearers (e.g. based on the security configuration at the RB configuration—master key is configuration is used) and, consider as SN terminated bearers all the bearers whose identifiers are not identified as MN terminated bearers (e.g. all DRB identity values above the last RB identifier for an MN terminated bearers), until the maximum value. These will all be included in the list of DRBs to be removed. For example, let's assume the UE 120 is configured with MN terminated RBs with IDs 1, 2 and 3; Then, an SN is added and RBs 4, 5 and 6 are configured. These are the configurations known at the MN when the MN initiated CHO preparation towards a target MN candidate. If the target candidate accepts the CHO and prepares the CHO target candidate configuration, it decides to release the SN configuration (in this case the SN terminated DRBs) by including in the list of RBs to be release the identifiers 4, 5, 6, . . . up to the maximum number of DRBs, to make sure all SN terminated bearers are released.

Upon reception of the UE 120's configuration by MN upon CHO preparation, containing the UE 120's MN terminated DRBs and a list of potential SN terminated DRBs. The MN can provide the SN with a list of allowed DRB Identities which the SN can configure the UE 120 to use at any time without informing the MN. Since the MN doesn't know which of these DRB Identities are in use at any given time, it can instruct the UE 120 to release all potential SN terminated DRBs. If the UE 120 is instructed to release a DRB which is not configured, the UE 120 will ignore that DRB identity and will not consider it as a reconfiguration error.

An example of the method executed at the first network node 111 (also called a gNodeB—gNB) operating as a source Master Node (referred to as MN below) for a UE 120 operating in MR-DC and/or having SN terminated bearers, comprises:

Configuring 501 a UE 120 with CHO configuration while the UE 120 is operating in MR-DC; and/or Configuring 501 a UE 120 with CHO configuration while the UE 120 has configured SN terminated bearers; and/or Configuring 501 a UE 120 with MR-DC configurations (e.g. a configuration to start operating in MR-DC, like an RRCReconfiguration upon which the UE 120 performs PSCell addition) while the UE 120 is monitoring CHO; and/or Configuring a UE 120 with SN terminated bearers while the UE 120 is monitoring CHO; and/or Configuring a UE 120 with MR-DC configurations and CHO in the same message e.g. an RRCReconfiguration; and/or Configuring a UE 120 with SN terminated bearers and CHO in the same message e.g. an RRCReconfiguration;

Determining a first range of bearer identifiers that are used for MN terminated bearers;

This first range is allocated by the MN itself e.g. before the MN provides the SN with another list of possible identifiers to be used by SN terminated bearers.

Determining a second range of bearer identifiers that may be used for SN terminated bearers;

This second range is allocated by the MN and provided to the SN. The MN is not certain over time that the SN is going to add and/or remove bearers using these identifiers from the second range, but the MN knows that is the SN adds or removes a bearers it should use any of these identifiers from the second range.

Indicating 504 to an MN target candidate for conditional handover (CHO) an indication derived from a first range of bearer identifiers that are used for MN terminated bearers;

In one embodiment, that indication is a list of bearer identifiers whosele elements are the first range of bearer identifiers.

In another embodiment, that indication is one element of a list of bearer identifiers whose elements are the first range of bearer identifiers.

This element may be the last element of the list within the first range. For example, if the first range is 0-3, which is an interval of integers, the elements in the list may be 0, 1, 2, 3 which would correspond to the radio bearer IDs used for MN terminated bearers. Then, the last element would be "3". Based on that the target MN candidate knows that SN terminated bearers, if configured at the UE 120, would start at identifier "4" onwards. And, if it wants to delete, it could delete all possible bearers starting from 4 onwards.

Indicating 505 to an MN target candidate for conditional handover (CHO) an indication derived from a second range of bearer identifiers that are used for SN terminated bearers;

In one embodiment, that indication is a list of bearer identifiers whose elements are the second range of bearer identifiers.

In another embodiment, that indication is one element of a list of bearer identifiers whose elements are the second range of bearer identifiers.

This element may be the first element of the list within the second range. For example, if the first range is 4-12, which is an interval of integers, the elements in the list may be 4, 5, . . . , 12 which would correspond to the radio bearer IDs used for SN terminated bearers. Then, the first element would be "4". Based on that the target MN candidate knows that SN terminated bearers, if configured at the UE 120, would start at identifier "4" onwards. And, if it wants to delete, it could delete all possible bearers starting from 4 onwards.

The understanding at the MN concerning the bearers to be possibly configured by the SN comes form the fact that the MN itself allocated a possible set of bearer IDs for SN terminated DRBs, and indicates that to the SN as part of the SN addition procedure, in the IE/Group Name "Available DRB IDs" within the S-NODE ADDITION REQUEST message, as shown below:

| IE/Group Name | Presence | Range | IE type and reference | Semantics description | Criticality | Assigned Criticality |
|---|---|---|---|---|---|---|
| Available DRB IDs | C-ifSNterminated | | DRB List 9.2.1.29 | Indicates the list of DRB IDs that the S-NG-RAN node may use for SN-terminated bearers. | YES | reject |

| Condition | Explanation |
|---|---|
| ifSNterminated | This IE shall be present if there is at least one PDU Session Resource Setup info—SN terminated in the PDU Session Resources To Be Added List IE. |

[ . . . ]
3GPP TS 38.423 9.2.1.29 DRB List
This IE contains a list of DRBs.

| IE/Group Name | Presence | Range | IE type and reference | Semantics description |
|---|---|---|---|---|
| DRB List | | 1 . . . <maxnoofDRBs> | | |
| >DRB ID | M | | 9.2.3.33 | |

| Range bound | Explanation |
|---|---|
| maxnoofRBs | Maximum no. of DRBs Value is 32. |

[ . . . ]
Releasing MR-DC configurations upon the detection that CHO execution has been performed by a UE 120 in one of the target MN candidates i.e. upon the reception of a message from a target candidate MN where the UE 120 has sent an RRCReconfigurationComplete. Related to this action of releasing of MR-DC and SN terminated bearer configurations, there may be different dependent embodiments:
  Configurations to be deleted e.g. comprise at least one of the following configurations:
    SN-terminated Radio Bearers configurations;
    SCG configuration;
    Measurement configurations (measConfig) associated with SCG;

An example of the method executed at a second network node 112 (also called a gNodeB—gNB) operating as a target candidate Master Node, comprises:
  Receiving 601 a preparation message from the first network node 111 (e.g. source MN) for Conditional Handover, the message comprising an indication derived from a first range of bearer identifiers that are used for MN terminated bearers;
    In one embodiment, that indication is a list of bearer identifiers whose elements are the first range of bearer identifiers.
    In another embodiment, that indication is one element of a list of bearer identifiers whose elements are the first range of bearer identifiers.
      This element may be the last element of the list within the first range. For example, if the first range is 0-3, which is an interval of integers, the elements in the list may be 0, 1, 2, 3 which would correspond to the radio bearer IDs used for MN terminated bearers. Then, the last element would be "3". Based on that the target MN candidate knows that SN terminated bearers, if configured at the UE 120, would start at identifier "4" onwards. And, if it wants to delete, it could delete all possible bearers starting from 4 onwards.
  Receiving 602 a preparation message from a first network node (e.g. source MN) for Conditional Handover, the message comprising an indication derived from a second range of bearer identifiers that are used for SN terminated bearers;
    In one embodiment, that indication is a list of bearer identifiers whose elements are the second range of bearer identifiers.
    In another embodiment, that indication is one element of a list of bearer identifiers whose elements are the second range of bearer identifiers.
      This element may be the first element of the list within the second range. For example, if the first range is 4-12, which is an interval of integers, the elements in the list may be 4, 5, . . . , 12 which would correspond to the radio bearer IDs used for SN terminated bearers. Then, the first element would be "4". Based on that the target MN candidate knows that SN terminated bearers, if configured at the UE 120, would start at identifier "4" onwards. And, if it wants to delete, it could delete all possible bearers starting from 4 onwards.
  Determining 603 the Radio Bearer identifiers for SN terminated bearers;
    In one dependent embodiment this is done by decoding the UE 120's configuration used in source. The SN terminated bearers are the ones whose security is associated to a secondary key.

In another dependent embodiment this is done by using indications from the source MN concerning information of potential SN terminated RBs;
  In one dependent embodiment, the list of bearers to be deleted is a list of SN terminated bearers, that are to be included in the "RBs remove list" (e.g. DRB-ToReleaseList::=SEQUENCE (SIZE (1 . . . maxDRB)) OF DRB-Identity) that will be provided to the UE 120 as part of the CHO target candidate configuration;
    In one embodiment, the list of bearer identifiers in the "RBs remove list" contains all possible integers from 0 to 32, except the bearer identifiers indicated from the source MN as the identifiers of MN terminated bearers.
      For example, if the source MN indicates a list of MN terminated bearers whose RBs identifiers are 1, 2, 5, 10, the target candidate MN includes in its configuration to be provided to the UE 120, in the "RBs remove list" the values 0, 3, 4, 6, 7, 8, 9, 11, 12, 13, 14, . . . , 32.
  In another embodiment, that indication is one element of a list of bearer identifiers whose elements are the first range of bearer identifiers.
    In one dependent embodiment the source MN indicates the last element of the list within the first range. For example, if the first range is 0-3, which is an interval of integers, the elements in the list may be 0, 1, 2, 3 which would correspond to the radio bearer IDs used for MN terminated bearers. Then, the last element would be "3". Based on that the target MN candidate determines that SN terminated bearers, if configured at the UE 120, would start at identifier "4" onwards. And, if it wants to delete, it could delete all possible bearers starting from 4 onwards. Hence, the target candidate MN sets the "RBs remove list" with the values 4, 6, 7, 8, 9, 11, 12, 13, 14, . . . 32.
  In another embodiment, that indication is one bearer identifier, known at the UE 120 to be the maximum identifier used for an bearer that needs to be maintained i.e. not deleted and/or released. Upon reception of the message with that integer value, the UE 120 deletes and/or releases all RBs whose identifiers are larger than that value.
  In one embodiment, the list of bearer identifiers in the "RBs remove list" contains the bearer identifiers indicated from the source MN as the identifiers of potential SN terminated bearers.
    This embodiment relies on the source MN determining the potential SN terminated bearers. For example, the source MN has indicated to the SN a list of RBs identifiers to be used by the SN, if the SN wants to add SN terminated RBs. However, when the target MN candidate prepared the CHO candidate target configuration it is not certain all these RBs are being used by the UE 120 upon this CHO preparation. Similarly, it is not certain that all these RBs are being used by the UE 120 upon CHO execution.
  In another embodiment, the list of bearer identifiers in the "RBs remove list" contains the bearer identifiers indicated from the source MN as the identifiers of SN terminated bearers, and all other remaining integers from 0 to 32, except the RBs identifiers for MN terminated bearers;
    This embodiment relies on the target MN candidate determining the potential SN terminated bearers.
  In another embodiment, that indication is one element of a list of bearer identifiers whose elements are the second range of bearer identifiers.
    In one dependent embodiment, this element may be the first element of the list within the second range. For example, if the first range is 4-12, which is an interval of integers, the elements in the list may be 4, 5, . . . , 12 which would correspond to the radio bearer IDs used for SN terminated bearers. Then, the first element would be "4". Based on that the target MN candidate knows that SN terminated bearers, if configured at the UE 120, would start at identifier "4" onwards. And, if it wants to delete, it could delete all possible bearers starting from 4 onwards.
  In another embodiment, that indication is one bearer identifier, known at the UE 120 to be the first identifier used for an bearer that needs to be released and/or deleted. Upon reception of the message with that integer value, the UE 120 deletes and/or releases all RBs whose identifiers are equal or larger than that value.
Preparing and/or creating and/or generating 604 a CHO target candidate configuration (e.g. an RRCReconfiguration message to be applied upon the execution of a trigger and/or execution condition, possibly configured by the source MN) the configuration comprising at least one of the following:
  A list of radio bearers to be deleted (e.g. in the DRBs remove list and/or SRBs remove list);
  An indication to the UE 120 that the UE 120 shall delete all SN terminated bearers;
  The UE 120 determines SN terminated bearers based on its configuration, where these are the ones with secondary security keys configurations.
Transmitting the previous message to the source MN (and the source MN configures the UE 120 with CHO configuration, using that message or its content as part of a CHO target configuration);
In one embodiment, the MN informs the SN whenever it configures the UE 120 with a conditional handover configuration, whereupon the SN stops performing reconfigurations without MN involvements. If the SN requires to modify any configurations, it does so via the MN. If the conditional handover is cancelled, the MN informs that SN of this, which allows the SN again perform SN modifications without MN involvement In another embodiment, the conditional handover command releases the SCG configurations when the UE 120 executes the CHO in a candidate node, and when the source MN releases the source SN, it includes an indication in the release message that the release is due to a conditional handover.

The SN can then respond to the source MN with an SN Release acknowledge including the latest SN and/or SCG configuration (either full or delta) including any forwarding address required. The source MN can forward this information to the candidate node which can reconfigure the UE 120 to forward the outstanding packets.

The method executed at a third network node 113 (also called a gNodeB—gNB) operating as a Secondary Node (SN), comprises:

Receiving from a UE 120 operating in MR-DC and/or having SN terminated bearers an indication (e.g. via SRB3 if configured, or via an SRB1 terminated in the SCG if configured or via lower layer signaling like a Uplink Control Information, or MAC CE) indicating that CHO trigger and/or execution condition towards a specific target candidate MN and/or target candidate cell is executed (Note: This step is sort of independent and does not have to exist for the sake of embodiments herein. It could be seen as an additional option).

In a dependent embodiment, upon reception of that indication from the UE 120 the SN may stop the transmission of data associated to SN terminated bearers;

In a dependent embodiment, upon reception of that indication from the UE 120 the SN may indicate that event (i.e. CHO execution leading to suspension of SN operation) to the source MN (so the MN can stop forwarding data via MN terminated bearers associated to the SCG, e.g., MN terminated DL split RBs).

In a dependent embodiment, the SN transmits a response message to the UE 120 confirming the reception of the indication;

In another dependent embodiment the SN suspends the operation of SN terminated bearers and any operation towards the SCG such as MN terminated bearers associated with the SCG, measurement configurations associated to the SCG and/or the SN, etc.

Performing further actions related to packet forwarding (see detailed description for embodiments related to these actions)

Embodiment 1: Inform SN of Ongoing CHO

In one embodiment, when a source MN such as the first network node 111, decides to configure a UE 120 operating in dual connectivity with a conditional handover configuration, it will inform the SN of this. This may e.g. be done via extending an existing message (e.g. SN Modification Request) or via introducing a new message. Similarly, if the conditional handover is cancelled, e.g. because the candidate target(s) may no longer provide radio resources to the UE 120, the source MN can inform the source SN of the cancellation.

When the SN receives this message indicating an ongoing CHO, the SN stops any SN initiated reconfiguration without MN involvement until it has received an indication from the MN that the restriction is no longer valid, e.g. the CHO is cancelled. If the SN receives an indication that the CHO is cancelled, it may resume reconfiguring the UE 120's SN and/or SCG configurations.

Embodiment 1a: Extend Existing Messages

If the SN receives this message indicating that an ongoing CHO is cancelled, the SN may again perform SN initiated reconfiguration without MN involvement.

3GPP TS 38.423 9.1.2.5 S-Node Modification Request

If an existing message is extended, this may be done by extending the cause values with e.g. 'Conditional MN Mobility' and 'Conditional MN Mobility Cancel'.

This message may be sent by the M-NG-RAN node to the S-NG-RAN node to either request the preparation to modify S-NG-RAN node resources for a specific UE 120, or to query for the current SCG configuration, or to provide the S-RLF-related information to the S-NG-RAN node.

Direction: M-NG-RAN node ⊐ S-NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | reject |
| S-NG-RAN node UE XnAP ID | M | | NG-RAN node UE XnAP ID 9.2.3.16 | Allocated at the S-NG-RAN node | YES | reject |
| Cause | M | | 9.2.3.2 | | YES | Ignore |
| <<skipped parts>> | | | | | | |

3GPP TS 38.423 9.2.3.2 Cause

The purpose of the Cause IE is to indicate the reason for a particular event for the XnAP protocol.

| IE/Group Name | Presence | Range | IE Type and Reference | Semantics Description |
|---|---|---|---|---|
| CHOICE Cause Group | M | | | |
| >Rado Network Layer | | | | |
| >>Radio Network Layer Cause | M | | ENUMERATED ( <<skipped parts>> MN Mobility, SN Mobility, Count reaches max value, Unknown Old NG-RAN node UE XnAP ID, PDCP Overload, DRB ID not available, | |

| IE/Group Name | Presence | Range | IE Type and Reference | Semantics Description |
|---|---|---|---|---|
| | | | Unspecified. . . . , UE Context ID not known, Non-relocation of context, Conditional MN Mobility, Conditional MN Mobility Cancel) | |

| Radio Network Layer cause | Meaning |
|---|---|
| MN Mobility | The procedure is initiated due to relocation of the M-NG-RAN node UE context |
| SN Mobiity | The procedure is initiated due to relocation of the S-NG-RAN node UE context |
| Count reaches max value. | Indicates the PDCP COUNT for UL or DL reached the max value and the bearer may be released. |
| Unknown Old NG-RAN node UE XnAP ID | The action failed because the Old NG-RAN node UE XnAP ID or the S-NG-RAN node UE XnAP ID is unknown. |
| PDCP Overload | The procedure is initiated due to PDCP resource limitation. |
| DRB ID not available | The action failed because the M-NG-RAN node is not able to provide additional DRB IDs to fee S-NG-RAN node. |
| Unspecified | Sent for radio network layer cause when none of the specified cause values applies. |
| UE Context ID not known | The context retrieval procedure cannot be performed because the UE context cannot be identified |
| Non-relocation of context | The context retrieval procedure is not performed because the old RAN node has decided not to relocate the UE context. |
| Conditional MN Mobility | The procedure is initiated due to condtional relocation of the M-NG-RAN node UE context. |
| Conditional MN Mobility Cancel | The procedure is initiated due to cancellation of conditional relocation of fee M-NG-RAN node UE context. |

Embodiment 1b: Introduce New Message

If a new message is introduced, this may e.g. be implemented as:

3GPP TS 38.423 9.1.2.5 CHO Indication

This message is sent by the M-NG-RAN node to the S-NG-RAN node to inform the S-NG-RAN node of initiation or cancellation of a conditional handover.

Direction: M-NG-RAN node→S-NG-RAN node.

3GPP TS 38.423 9.2.3.x CHO Status

This IE is used to indicate to the SN whether the MN has configured a CHO or not.

| IE/Group Name | Presence | Range | IE type and reference | Semantics description |
|---|---|---|---|---|
| CHO status | M | | ENUMERATED configured. canceled. . . . ) | |

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | reject |
| S-NG-RAN node UE XnAP ID | M | | NG-RAN node UE XnAP ID 9.2.3.16 | Allocated at the S-NG-RAN node | YES | reject |
| CHO status | M | | 9.2.3.x | | YES | ignore |

Embodiment 2: Forward Latest SN Configurations after CHO Execution

In another embodiment, the SN is allowed to continue to reconfigure the UE 120 without MN involvement even if the UE 120 is operating in MR-DC or has SN terminated RBs configured.

The conditional handover configurations contain an indication for the UE 120 to release all SCG configurations. Any SN terminated radio bearer configured at the point of providing the CHO configuration may be reconfigured as MN terminated MCG bearers in the CHO configuration.

However, since the SN is allowed to continue to reconfigure the UE 120, e.g. add and/or remove SN terminated radio bearers, the CHO configuration may not contain a complete set of configurations.

When the UE 120 executes the CHO, it will release the SCG as per the indication in the message. The UE 120 will at this point stop any SCG transmission, but the SN is unaware that the UE 120 has triggered the CHO so it will continue to attempt to transmit data on the SN terminated bearers.

Once the UE 120 has completed the CHO to the candidate target node, the candidate target node informs the source MN and the source MN in turn releases the SN.

By including an indication in the SN Release Request message, the SN can provide the latest SN configuration to the source MN in the SN Release Request Acknowledge message.

The source MN can then forward these configurations to the candidate target node which can reconfigure the UE 120 accordingly (e.g. reconfigure any additional SN terminated bearer as an MN terminated bearer in the candidate target cell).

Figure 7A:
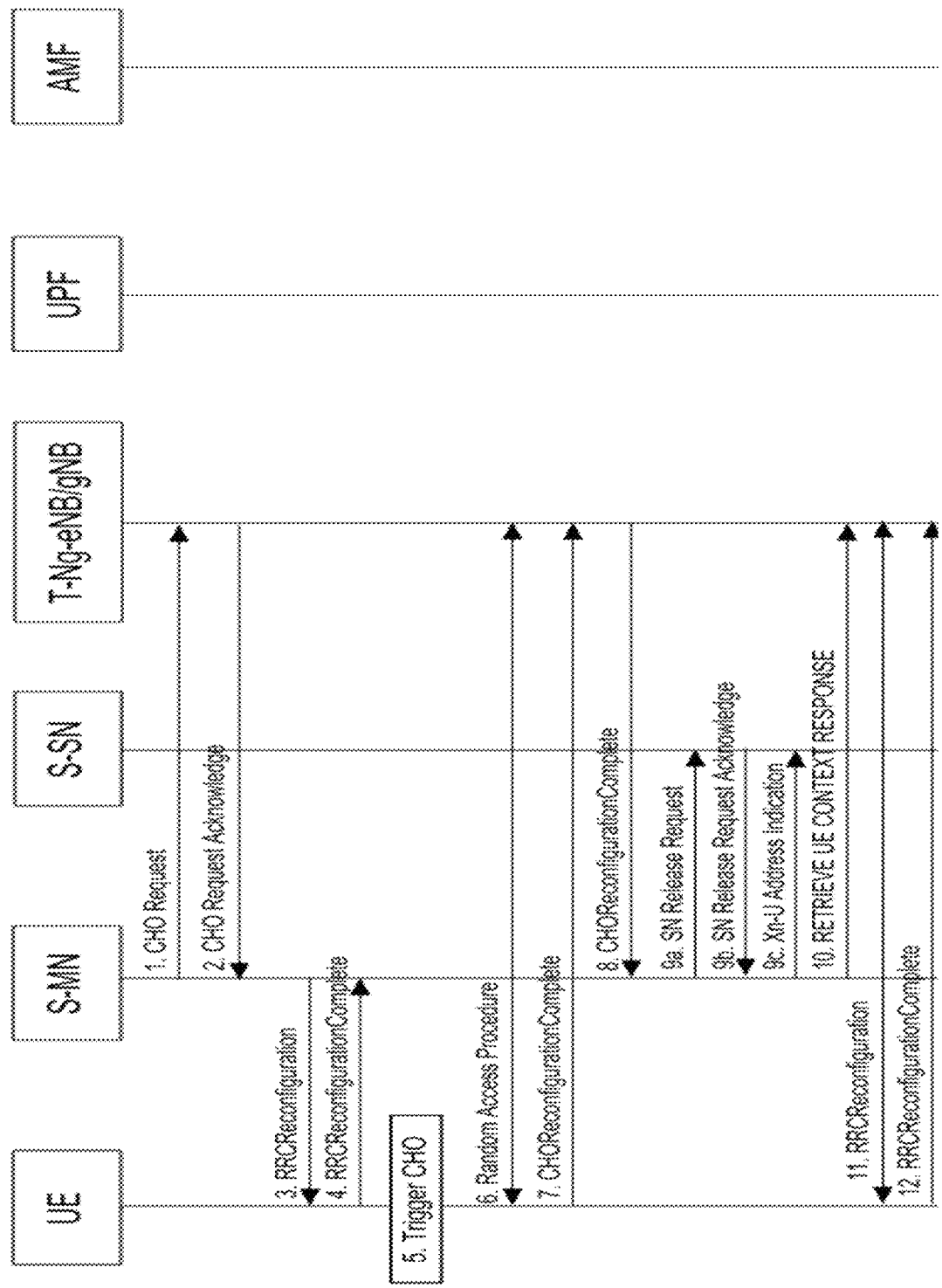
FIGS. 7 *a* and *b* are sequence diagrams illustrating embodiments herein.
Figure 7B:
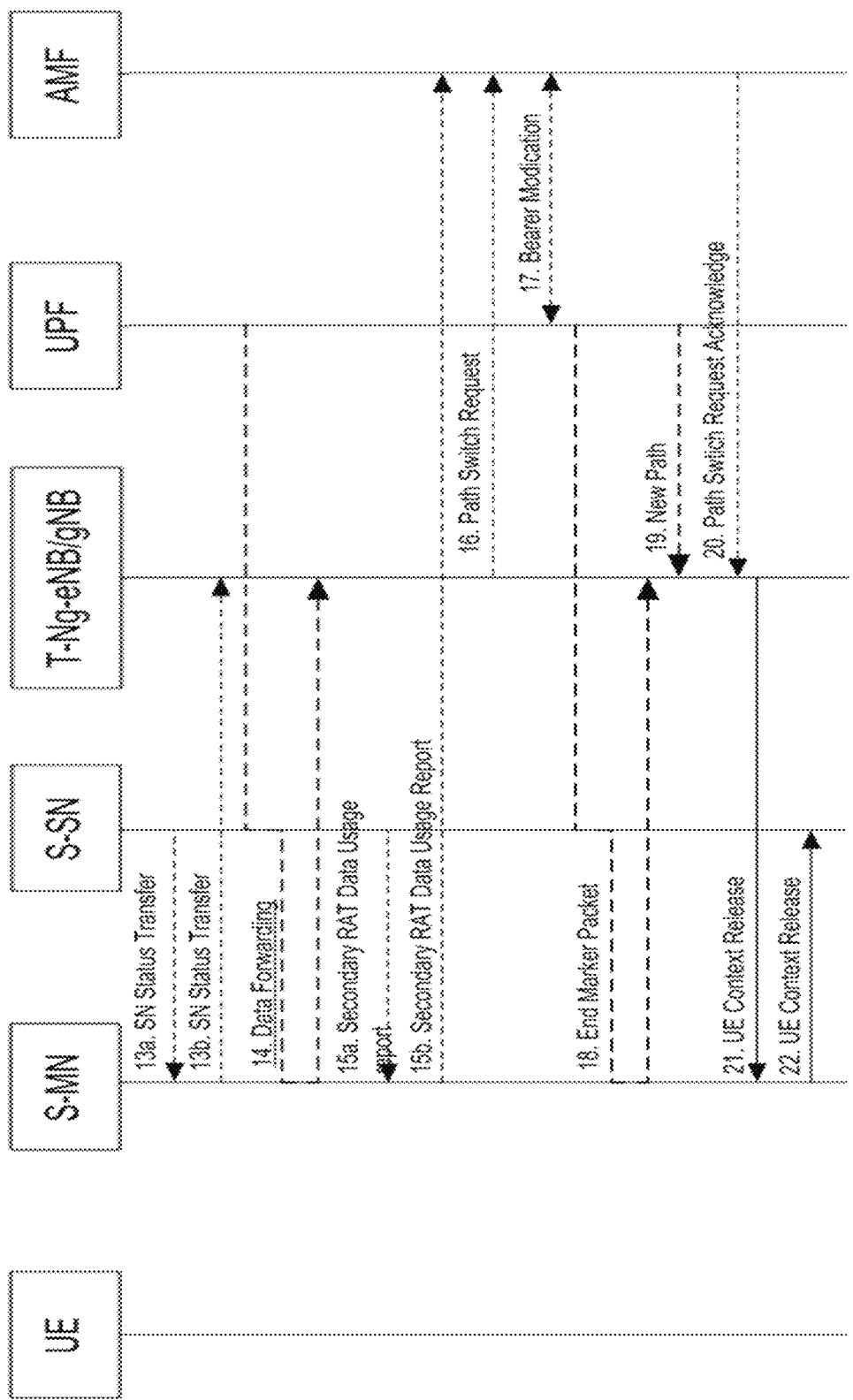

FIGS. 7*a* (Steps 1-12) and 7*b* (Steps 13a-22) depict an example scenario according to embodiments herein.
- Step 0. UE 120 is operating in MR-DC with source MN and source SN
- Step 1. The source MN issues a CHO Request message to one or more candidate gNBs including both MCG and SCG configuration.
- Step 2. The candidate gNB sends CHO response including configuration of CHO candidate cell to the source MN, which releases the SCG configuration, and may also provide forwarding addresses to the source MN.
- Step 3. The source MN sends a RRCReconfiguration message to the UE 120, containing the configuration of CHO candidate cell(s) and CHO execution condition(s).
- Step 4. UE 120 sends an RRCReconfigurationComplete message to the source gNB acknowledging the conditional configurations.
- Step 5. When UE 120 fulfils execution condition for candidate cell, applies the conditional configurations which releases the entire SCG configuration
- Step 6. UE 120 initiates a Random Access procedure to the candidate gNB.
- Step 7. UE 120 sends a CHOReconfigurationComplete message to the candidate gNB
- Step 8. Candidate gNB sends a CHOReconfiguration-Complete message to the source MN
- Step 9. The source MN initiates the release of the source SN resources towards the source SN including a Cause indicating Conditional MCG mobility. The SN acknowledges the release request. If data forwarding is needed, the MN provides data forwarding addresses to the source SN. The SN includes any SN terminated bearer to be released in the SN Release Request Acknowledge. Reception of the SN Release Request message triggers the source SN to stop providing user data to the UE 120.
- Step 10. The source MN may provide the candidate gNB with a list of the SN terminated bearers obtained in step 9.
- Step 11. The candidate gNB sends an RRCReconfiguration message to the UE 120 including release and/or reconfigurations for the SN terminated bearers obtained in step 10.
- Step 12. The UE 120 sends a RRCReconfigurationComplete to the candidate gNB acknowledging the reconfiguration.
- Step 13. For SN terminated bearers using RLC AM, the SN sends the SN Status transfer, which the source MN sends then to the candidate gNB.
- Step 14. If applicable, data forwarding from the source SN takes place. It may start as early as the source SN receives the SN Release Request message from the MN.
- Step 15a. The source SN sends the Secondary RAT Data Usage Report message to the source MN and includes the data volumes delivered to and received from the UE 120 as described in clause 10.11.2.
    NOTE 2: The order the SN sends the Secondary RAT Data Usage Report message and performs data forwarding with MN is not defined. The SN may send the report when the transmission of the related QoS flow is stopped.
- Step 15b. The source MN sends the Secondary RAT Report message to AMF to provide information on the used NR and/or E-UTRA resource.
- Step 16-20. The candidate gNB initiates the Path Switch procedure.
- Step 21. The candidate gNB initiates the UE 120 Context Release procedure towards the source MN.
- Step 22. Upon reception of the UE Context Release message from MN, the source SN can release radio and C-plane related resource associated to the UE 120 context. Any ongoing data forwarding may continue.

Embodiment 3: UE 120 Autonomous Actions Regarding Release of Configurations

In this part we describe an example of an implementation in the RRC specifications of the embodiment where the UE 120 operating in MR-Dc and/or having configured SN terminated RBs execute CHO and, as part of that autonomously releases SN terminated RBs and releases MR-DC configurations, as part of the CHO execution procedure.

Reception of an RRCReconfiguration by the UE 120

The UE 120 shall perform the following actions upon reception of the RRCReconfiguration or upon applying a stored RRCReconfiguration message upon conditional reconfiguration execution:

1> if the RRCReconfiguration is received via other RAT (i.e., inter-RAT handover to NR):
  2> if the RRCReconfiguration does not include the fullConfig and the UE 120 is connected to 5GC (i.e., delta signalling during intra 5GC handover):
    3> re-use the source RAT SDAP and PDCP configurations if available (i.e., current SDAP and/or PDCP configurations for all RBs from source E-UTRA RAT prior to the reception of the inter-RAT HO RRCReconfiguration message);

1> else:
  2> if the RRCReconfiguration includes the fullConfig:
    3> perform the full configuration procedure as specified in 5.3.5.11;
1> if the RRCReconfiguration includes the masterCellGroup:
  2> perform the cell group configuration for the received masterCellGroup according to 5.3.5.5;
1> if the RRCReconfiguration includes the masterKeyUpdate:
  2> perform AS security key update procedure as specified in 5.3.5.7;
1> if the RRCReconfiguration includes the sk-Counter:
  2> perform security key update procedure as specified in 5.3.5.7;
1> if the RRCReconfiguration includes the secondary-CellGroup:
  2> perform the cell group configuration for the SCG according to 5.3.5.5;
1> if the RRCReconfiguration is applied as part of conditional handover execution:
  2> perform MR-DC release as specified in section 5.3.5.10;
  2> perform DRB release as specified in 5.3.5.6.4;
1> if the RRCReconfiguration includes the mrdc-SecondaryCellGroupConfig:
  2> if the mrdc-SecondaryCellGroupConfig is set to setup:
    3> if the mrdc-SecondaryCellGroupConfig includes mrdc-ReleaseAndAdd:
      4> perform MR-DC release as specified in section 5.3.5.10;
    3> if the received mrdc-SecondaryCellGroup is set to nr-SCG:
      4> perform the RRC reconfiguration according to 5.3.5.3 for the RRCReconfiguration message included in nr-SCG;
    3> if the received mrdc-SecondaryCellGroup is set to eutra-SCG:
      4> perform the RRC connection reconfiguration as specified in TS 36.331 [10], clause 5.3.5.3 for the RRCConnectionReconfiguration message included in eutra-SCG;
  2> else (mrdc-SecondaryCellGroupConfig is set to release):
    3> perform MR-DC release as specified in section 5.3.5.10;
1> if the RRCReconfiguration message includes the radioBearerConfig:
  2> perform the radio bearer configuration according to 5.3.5.6;
1> if the RRCReconfiguration message includes the radioBearerConfig2:
  2> perform the radio bearer configuration according to 5.3.5.6;
1> if the RRCReconfiguration message includes the measConfig:
  2> perform the measurement configuration procedure as specified in 5.5.2;
1> if the RRCReconfiguration message includes the dedicatedNAS-MessageList:
  2> forward each element of the dedicatedNAS-MessageList to upper layers in the same order as listed;
1> if the RRCReconfiguration message includes the dedicatedSIB1-Delivery:
  2> perform the action upon reception of SIB1 as specified in 5.2.2.4.2;
1> if the RRCReconfiguration message includes the dedicatedSystemInformationDelivery:
  2> perform the action upon reception of System Information as specified in 5.2.2.4;
1> if the RRCReconfiguration message includes the otherConfig:
  2> perform the other configuration procedure as specified in 5.3.5.9;
1> if the RRCReconfiguration message includes the conditionalReconfiguration:
  2> perform conditional reconfiguration as specified in 5.3.5.x;

Editor's Note: FFS Confirm the usage of an enhanced version of the RRCReconfiguration message to configure conditional handover.

1> set the content of RRCReconfigurationComplete message as follows:

Editor's Note: FFS Whether we need an exception to the transmission of the RRCReconfigurationComplete message i.e. not transmit if only conditional reconfiguration is included in the message.

Editor's Note: FFS Whether we need an exception to the transmission of the RRCReconfigurationComplete message i.e. not transmit in case the message contains CHO configuration and upon reception a trigger condition is fulfilled.

2> if the RRCReconfiguration includes the masterCellGroup containing the reportUplinkTxDirectCurrent; or
  2> if the RRCReconfiguration includes the secondaryCellGroup containing the reportUplinkTxDirectCurrent:
    3> include the uplinkTxDirectCurrentList for each serving cell with UL;
    3> if UE 120 is configured with SUL carrier:
      4> include uplinkDirectCurrentBWP-SUL for each serving cell with SUL within the uplinkTxDirectCurrentList;
  2> if the received RRCReconfiguration message includes the mrdc-SecondaryCellGroupConfig with mrdc-SecondaryCellGroup set to eutra-SCG:
    3> include eutra-SCG-Response within scg-Response in accordance with TS 36.331 [10] clause 5.3.5.3;
  2> if the received RRCReconfiguration message includes the mrdc-SecondaryCellGroupConfig with mrdc-SecondaryCellGroup set to nr-SCG:
    3> include nr-SCG-Response within scg-Response;
1> if the UE 120 is configured with E-UTRA nr-SecondaryCellGroupConfig (MCG is E-UTRA):
  2> if RRCReconfiguration was received via SRB1:
    3> submit the RRCReconfigurationComplete via the E-UTRA MCG embedded in E-UTRA RRC message RRCConnectionReconfigurationComplete as specified in TS 36.331 [10];
    3> if reconfigurationWithSync was included in spCellConfig of an SCG:
      4> initiate the Random Access procedure on the SpCell, as specified in TS 38.321 [3];
    3> else:
      4> the procedure ends;
NOTE 1: The order the UE 120 sends the RRCConnectionReconfigurationComplete message and performs the Random Access procedure towards the SCG is left to UE 120 implementation.

2> else (RRCReconfiguration was received via SRB3):
   3> submit the RRCReconfigurationComplete message via SRB3 to lower layers for transmission using the new configuration;
NOTE 2: In (NG)EN-DC and NR-DC, in the case RRCReconfiguration is received via SRB1, the random access is triggered by RRC layer itself as there is not necessarily other UL transmission. In the case RRCReconfiguration is received via SRB3, the random access is triggered by the MAC layer due to arrival of RRCReconfigurationComplete.
1> else if RRCReconfiguration message was received within the nr-SCG within mrdc-SecondaryCellGroup (NR SCG RRC Reconfiguration):
  2> if reconfigurationWithSync was included in spCellConfig in nr-SCG:
   3> initiate the Random Access procedure on the PSCell, as specified in TS 38.321 [3];
  2> else
   3> the procedure ends;
1> else if RRCReconfiguration was received via SRB3:
  2> submit the RRCReconfigurationComplete message via SRB3 to lower layers for transmission using the new configuration;
1> else (MCG RRCReconfiguration):
  2> submit the RRCReconfigurationComplete message via SRB1 to lower layers for transmission using the new configuration;
  2> if this is the first RRCReconfiguration message after successful completion of the RRC re-establishment procedure:
   3> resume SRB2 and DRBs that are suspended;
1> if reconfigurationWithSync was included in spCellConfig of an MCG or SCG, and when MAC of an NR cell group successfully completes a Random Access procedure triggered above;
  2> stop timer T304 for that cell group;
  2> apply the parts of the CQI reporting configuration, the scheduling request configuration and the sounding RS configuration that do not require the UE 120 to know the SFN of the respective target SpCell, if any;
  2> apply the parts of the measurement and the radio resource configuration that require the UE 120 to know the SFN of the respective target SpCell (e.g. measurement gaps, periodic CQI reporting, scheduling request configuration, sounding RS configuration), if any, upon acquiring the SFN of that target SpCell;
  2> if the reconfigurationWithSync was included in spCellConfig of an MCG:
   3> if T390 is running:
    4> stop timer T390 for all access categories;
    4> perform the actions as specified in 5.3.14.4.
   3> if RRCReconfiguration does not include dedicatedSIB1-Delivery and
   3> if the active downlink BWP, which is indicated by the firstActiveDownlinkBWP-Id for the target SpCell of the MCG, has a common search space configured by searchSpaceSIB1:
    4> acquire the SIB1, which is scheduled as specified in TS 38.213 [13], of the target SpCell of the MCG;
    4> upon acquiring SIB1, perform the actions specified in clause 5.2.2.4.2;
  2> remove all the entries within VarConditionalReconfiguration, if any;
Editor's Note: FFS Whether we need to specify any UE 120 autonomous actions regarding VarMeasConfig associated to conditional handover.
Editor's Note: FFS Confirm the use of a UE 120 variable to handle CHO configurations e.g. VarConditionalReconfiguration.
  2> the procedure ends.
NOTE 3: The UE 120 is only required to acquire broadcasted SIB1 if the UE 120 can acquire it without disrupting unicast data reception, i.e. the broadcast and unicast beams are quasi co-located.
[ . . . ]
5.3.5.6.4DRB Release
The UE 120 shall:
1> for each drb-Identity value included in the drb-ToReleaseList that is part of the current UE 120 configuration; or
1> for each drb-Identity value that is to be released as the result of full configuration according to 5.3.5.11:
1> for each drb-Identity value associated to an SN-terminated bearer while the UE 120 is executing a conditional handover;
  2> release the PDCP entity and the drb-Identity;
  2> if SDAP entity associated with this DRB is configured:
   3> indicate the release of the DRB to SDAP entity associated with this DRB (TS 37.324 [24], clause 5.3.3);
  2> if the DRB is associated with an eps-BearerIdentity:
   3> if a new bearer is not added either with NR or E-UTRA with same eps-BearerIdentity:
    4> indicate the release of the DRB and the eps-BearerIdentity of the released DRB to upper layers.
NOTE 1: The UE 120 does not consider the message as erroneous if the drb-ToReleaseList includes any drb-Identity value that is not part of the current UE 120 configuration.
NOTE 2: Whether or not the RLC and MAC entities associated with this PDCP entity are reset or released is determined by the CellGroupConfig.

Embodiments herein comprise the handling of MR-DC configurations and SN terminated bearer configurations when the UE 120 executes CHO at the UE 120 side. That includes the deletion of these configurations to avoid state mismatch and the indication to the SN that CHO is being executed, so the SN knows the UE 120 suspends the operations configured by the SN.

Figure 8A:
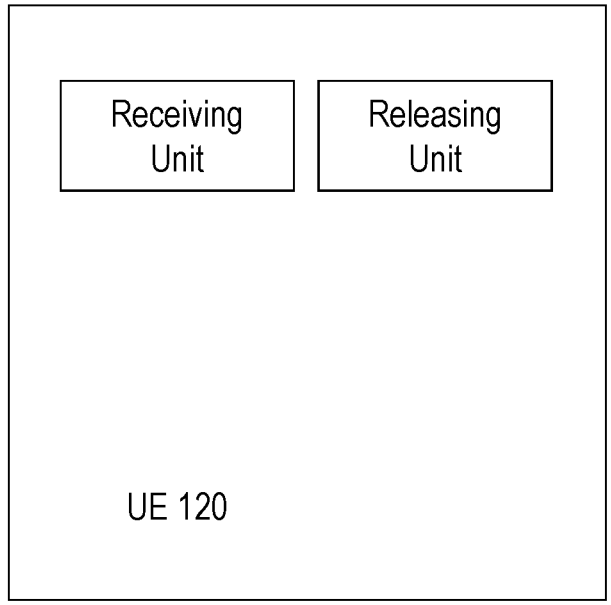
FIGS. 8 *a* and *b* are schematic block diagrams illustrating embodiments of a UE.

FIGS. 8 *a* and *b* show an example of the UE 120 comprising a receiving unit and a releasing unit. FIGS. 9 *a* and *b* show an example of the first network node 111 comprising a sending unit, a releasing unit and a determining unit. FIGS. 10 *a* and *b* show an example of the second network node 112 comprising a receiving unit, a determining unit, a generating unit and a transmitting unit.

Figure 8B:
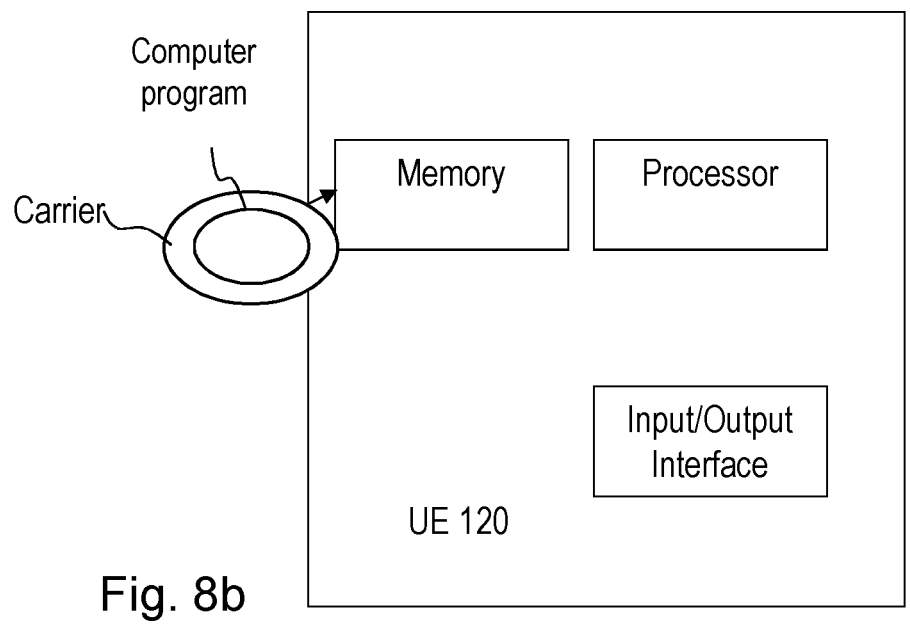
Figure 9A:
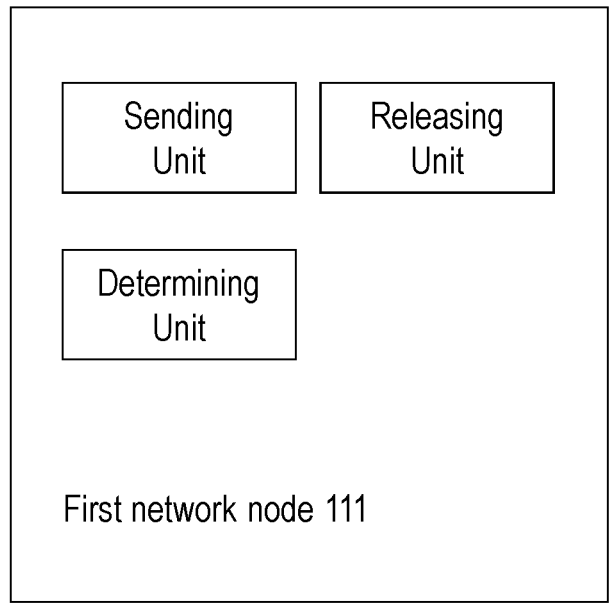
FIGS. 9 *a* and *b* are schematic block diagrams illustrating an embodiment of a first network node.
Figure 9B:
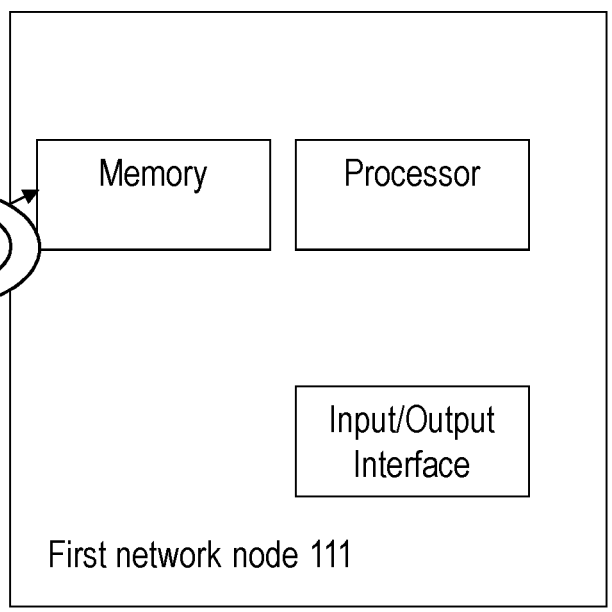
Figure 10B:
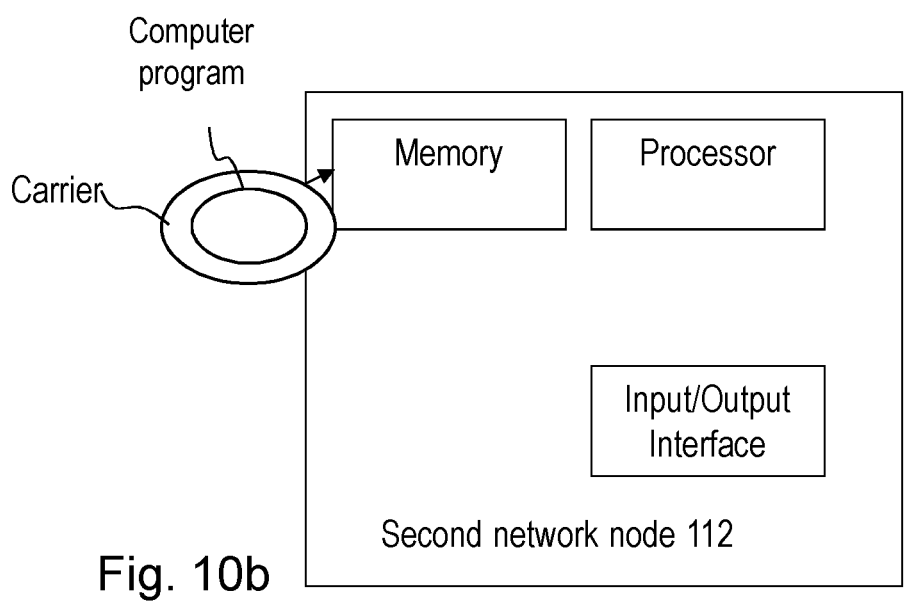

The UE 120, the first network node 111 and the second network node 112 may comprise a respective input and output interface configured to communicate with each other, see FIGS. 8*b*, 9*b* and 10*b*. The input and output interface may comprise a wireless receiver (not shown) and a wireless transmitter (not shown).

The embodiments herein may be implemented through a respective processor or one or more processors, such as the processor of a processing circuitry in the UE 120, the first network node 111 and the second network node 112 depicted in FIGS. 8b, 9b and 10b together with respective computer program code for performing the functions and actions of the embodiments herein. The program code mentioned above may also be provided as a computer program product, for instance in the form of a data carrier carrying computer program code for performing the embodiments herein when being loaded into the respective UE 120, first network node 111 and/or second network node 112. One such carrier may be in the form of a CD ROM disc. It is however feasible with other data carriers such as a memory stick. The computer program code may furthermore be provided as pure program code on a server and downloaded to the respective UE 120, first network node 111 and second network node 112.

The respective UE 120, first network node 111 and second network node 112 may further comprise respective a memory comprising one or more memory units. The memory comprises instructions executable by the processor in the respective UE 120, first network node 111 and second network node 112.

The memory is arranged to be used to store e.g. information, data, configurations, and applications to perform the methods herein when being executed in the respective UE 120, first network node 111 and second network node 112.

In some embodiments, a respective computer program comprises instructions, which when executed by the at least one processor, cause the at least one processor of the respective UE 120, first network node 111 and second network node 112 to perform the actions above.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the units in the respective UE 120, first network node 111 and second network node 112, described above may refer to a combination of analog and digital circuits, and/or one or more processors configured with software and/or firmware, e.g. stored in the respective UE 120, first network node 111 and second network node 112, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Some example Embodiments numbered 1-20 are described below. The following embodiments refer among other things to FIG. 3, FIG. 4, FIG. 5, FIG. 6, FIG. 8a,b, FIG. 9a,b and FIG. 10a,b.

Embodiment 1. A method performed by a User Equipment, UE, 120, e.g. for handling a Conditional Handover, CHO, from a first cell 115 to a second cell 116 in a wireless communications network 100:
wherein the UE 120 e.g. has Secondary Node, SN, terminated bearers and/or is operating in Multi Radio Access Technology Dual Connectivity, MR-DC, served by a Master Node, MN, 111 in the first cell 115 and by a Secondary Node, SN, 113 in a third cell 117, the method comprising any one or more out of
receiving 401 a CHO configuration from the first network node 111 acting as the MN, which CHO configuration e.g. comprises an indication e.g. a flag, to release configurations of any one or more out of: MR-DC and SN terminated bearers,
upon execution of the CHO according to the CHO configuration, releasing 403 the MR-DC configuration and the configuration for SN terminated bearers, which e.g. may mean upon the fulfillment of a trigger and/or execution conditions associated to a CHO configuration.

Embodiment 2. The method according to embodiment 1, wherein the receiving 401 the CHO configuration comprises any one out of:
receiving a CHO configuration while the UE 120 is operating in MR-DC and/or is configured with SN terminated bearers,
receiving configurations for SN terminated bearers and/or MR-DC configurations e.g. a configuration to start operating in MR-DC, like an RRCReconfiguration message upon which the UE performs PSCell addition while the UE 120 is monitoring CHO,
receiving MR-DC configurations and/or configurations for SN terminated bearers and CHO in the same message. E.g. an RRCReconfiguration message.

Embodiment 3. The method according to any of the embodiments 1-2, wherein any one or more out of:
the MR-DC configuration comprises at least one of the following configurations: SCG configuration; and Measurement configurations e.g. measConfig associated with a Secondary Cell Group SCG, and
the SN-terminated Radio Bearers configuration comprises any one out of: an SN terminated bearer associated to a logical channel that is associated to a Master Cell Group MCG; or an SN terminated bearer associated to a logical channel that is associated to an SCG;

Embodiment 4. The method according to any of the embodiments 1-3, wherein releasing 403 MR-DC configurations and configurations for SN terminated bearers upon the CHO execution is performed as an autonomous UE action:
when the UE 120 is any one or more out of: operating in MR-DC, has SN terminated bearer, has stored MR-DC configurations, and has SN terminated bearer configurations.

Embodiment 5. The method according to any of the embodiments 1-4, wherein releasing 403 MR-DC configurations and configurations for SN terminated bearers upon the CHO execution is performed:
when a Radio Resource Control configuration, RRCReconfiguration, to be applied upon CHO execution this may e.g. be a message prepared by target and stored at the UE includes an indication to release MR-DC configurations.

Embodiment 6. A computer program comprising instructions, which when executed by a processor, causes the processor to perform actions according to any of the embodiments 1-5.

Embodiment 7. A carrier comprising the computer program of embodiment 6, wherein the carrier is one of an electronic signal, an optical signal, an electromagnetic signal, a magnetic signal, an electric signal, a radio signal, a microwave signal, or a computer-readable storage medium.

Embodiment 8. A method performed by a first network node 111, e.g. for handling a Conditional Handover, CHO, of a User Equipment, UE, 120 from a first cell 115 to a second cell 116 in a wireless communications network 100,
which first network node 111 is operating as a source Master Node for the UE 120
which UE 120 e.g. has Secondary Node, SN, terminated bearers and/or is operating in Multi Radio Access Technology Dual Connectivity, MR-DC, served by the source Master Node, MN, 111 in the first cell 115 and by a Secondary Node, SN, 113 in a third cell 117, the method comprising any one or more out of:

sending 501 a CHO configuration to the UE 120, which CHO configuration e.g. comprises an indication e.g. a flag, to release configurations of any one or more out of: MR-DC and SN terminated bearers, sending 504 to one or more MN target candidates for the CHO, a first indication derived from a determined first range of bearer identifiers that are used for MN terminated bearers, e.g. in a preparation message for CHO, In this action the first network node 111 may sends an indication to candidate node that UE 120 is configured with mr-dc. This allows the candidate node to release the SCG. The indication is optional since the target could always release SCG.

sending 505 to one or more MN target candidates for the CHO, a second indication derived from a determined second range of bearer identifiers that are used for SN terminated bearers, e.g. in a preparation message for CHO upon detecting that execution of the CHO according to the CHO configuration has been performed by a UE 120 in one of the target MN candidates, e.g. the second network node 112, releasing 506 the MR-DC configuration and the configuration for SN terminated bearers. e.g. upon the reception of a message from a target candidate MN where the UE 120 has sent an RRCReconfigurationComplete. Related to this action of releasing of MR-DC and SN terminated bearer configurations. The release may be done by sending a message to the Secondary node (old SN). e also have an embodiment where upon releasing the MR-DC configurations, the first node provides the Secondary Node with data forwarding information and the SN provides any updated SN configuration to the MN. The MN can then forward this updated SN information to the candidate node (after triggering)

See embodiment 2 in detailed description

Embodiment 9. The method according to embodiment 8, further comprising any one or more out of:

determining 502, a first range of bearer identifiers that are used for MN terminated bearers, determining 503, a second range of bearer identifiers that are used for SN terminated bearers, Embodiment 10. The method according to any of the embodiments 8-9, further, wherein the sending 501 the CHO configuration comprises any one out of:

sending a CHO configuration while the UE 120 is operating in MR-DC and/or is configured with SN terminated bearers, sending configurations for SN terminated bearers and/or MR-DC configurations e.g. a configuration to start operating in MR-DC, like an RRCReconfiguration message upon which the UE performs PSCell addition while the UE 120 is monitoring CHO, sending MR-DC configurations and/or configurations for SN terminated bearers and CHO in the same message. E.g. an RRCReconfiguration message.

Embodiment 11. The method according to any of the embodiments 8-10, wherein any one or more out of:

the MR-DC configuration comprises at least one of the following configurations: SCG configuration; and Measurement configurations e.g. measConfig associated with a Secondary Cell Group SCG, and the SN-terminated Radio Bearers configuration comprises any one out of: an SN terminated bearer associated to a logical channel that is associated to a Master Cell Group MCG; or an SN terminated bearer associated to a logical channel that is associated to an SCG;

12. A computer program comprising instructions, which when executed by a processor, causes the processor to perform actions according to any of the embodiments 8-11.

Embodiment 13. A carrier comprising the computer program of embodiment 12, wherein the carrier is one of an electronic signal, an optical signal, an electromagnetic signal, a magnetic signal, an electric signal, a radio signal, a microwave signal, or a computer-readable storage medium.

Embodiment 14. A method performed by a second network node 112, e.g. for handling a Conditional Handover, CHO, of a User Equipment, UE, 120 from a first cell 115 to a second cell 116 in a wireless communications network 100, which second network node 112 is operating as a target candidate Master Node for the UE 120, which UE 120 e.g. has Secondary Node, SN, terminated bearers and/or is operating in Multi Radio Access Technology Dual Connectivity, MR-DC, served by a first network node 111 acting as source Master Node, MN, in the first cell 115 and by a third network node 111 acting as a Secondary Node, SN, 113 in a third cell 117, the method comprising any one or more out of:

receiving 601 from the first network node 111 a preparation message for CHO, which preparation message for CHO comprises a first indication derived from a first range of bearer identifiers that are used for MN terminated bearers, receiving 602 from the first network node 111 a preparation message for CHO, which preparation message for CHO comprises a second indication derived from a determined second range of bearer identifiers that are used for SN terminated bearers, determining 603 Radio Bearer identifiers for SN terminated bearers, generating 604 a CHO target candidate configuration, e.g. an RRCReconfiguration message to be applied upon the execution of a trigger and/or execution condition, possibly configured by the source MN, the configuration comprising at least one of the following: a list of radio bearers to be deleted e.g. in the DRBs remove list and/or SRBs remove list; and an indication to the UE 120 that the UE 120 shall delete all SN terminated bearers;

transmitting 605 to the first network node 111 the previous message e.g. the indication to the UE 120 that the UE 120 shall delete all SN terminated bearers, e.g. enabling the first network node 111 to configure the UE 120 with CHO configuration, using that message or its content as part of a CHO target configuration.

Embodiment 15. A computer program comprising instructions, which when executed by a processor, causes the processor to perform actions according to embodiment 14.

Embodiment 16. A carrier comprising the computer program of embodiment 15, wherein the carrier is one of an electronic signal, an optical signal, an electromagnetic signal, a magnetic signal, an electric signal, a radio signal, a microwave signal, or a computer-readable storage medium.

Embodiment 17. A User Equipment, UE, 120, e.g. configured to handle a Conditional Handover, CHO, from a first cell 115 to a second cell 116 in a wireless communications network 100, wherein the UE 120 e.g. is adapted to have Secondary Node, SN, terminated bearers and/or is operable in Multi Radio Access Technology Dual Connectivity, MR-DC, to be served by a Master Node, MN, 111 in the first cell 115 and by a Secondary Node, SN, 113 in a third cell 117, the UE 120 being configured to any one or more out of:
- receive a CHO configuration from the first network node 111 acting as the MN, which CHO configuration e.g. comprises an indication e.g. a flag, to release configurations of any one or more out of: MR-DC and SN terminated bearers, e.g. by means of a receiving unit in the UE 120,
- upon execution of the CHO according to the CHO configuration, release the MR-DC configuration and the configuration for SN terminated bearers, which e.g. may mean upon the fulfillment of a trigger and/or execution conditions associated to a CHO configuration, e.g. by means of a releasing unit in the UE 120.

Embodiment 18. The UE 120 according to embodiment 17, wherein the UE 120 further is configured to receive the CHO configuration, e.g. by means of a receiving unit in the UE 120, by any one out of:
- receiving a CHO configuration while the UE 120 is operating in MR-DC and/or is configured with SN terminated bearers,
- receiving configurations for SN terminated bearers and/or MR-DC configurations e.g. a configuration to start operating in MR-DC, like an RRCReconfiguration message upon which the UE performs PSCell addition while the UE 120 is monitoring CHO,
- receiving MR-DC configurations and/or configurations for SN terminated bearers and CHO in the same message. E.g. an RRCReconfiguration message.

Embodiment 19. The UE 120 according to any of the embodiments 17-18, wherein any one or more out of:
- the MR-DC configuration is adapted to comprise at least one of the following configurations: SCG configuration; and Measurement configurations e.g. measConfig associated with a Secondary Cell Group SCG, and
- the SN-terminated Radio Bearers configuration is adapted to comprise any one out of: an SN terminated bearer associated to a logical channel that is associated to a Master Cell Group MCG; or an SN terminated bearer associated to a logical channel that is associated to an SCG;

Embodiment 20. The UE 120 according to any of the embodiments 17-19, wherein the UE 120 further is configured to release MR-DC configurations and configurations for SN terminated bearers upon the CHO execution as an autonomous UE action when the UE 120 is any one or more out of: operating in MR-DC, has SN terminated bearer, has stored MR-DC configurations, and has SN terminated bearer configurations, e.g. by means of a releasing unit in the UE 120.

Embodiment 21. The UE 120 according to any of the any of the embodiments 17-20, wherein the UE 120 further is configured to release MR-DC configurations and configurations for SN terminated bearers upon the CHO execution when a Radio Resource Control configuration, RRCReconfiguration, to be applied upon CHO execution this may e.g. be a message prepared by target and stored at the UE includes an indication to release MR-DC configurations, e.g. by means of a releasing unit in the UE 120.

Embodiment 22. A first network node 111, e.g. configured to handle a Conditional Handover, CHO, of a User Equipment, UE, 120 from a first cell 115 to a second cell 116 in a wireless communications network 100,
- which first network node 111 is operable as a source Master Node for the UE 120, and
- which UE 120 e.g. is adapted to have Secondary Node, SN, terminated bearers and/or is operable in Multi Radio Access Technology Dual Connectivity, MR-DC, to be served by the source Master Node, MN, 111 in the first cell 115 and by a Secondary Node, SN, 113 in a third cell 117, the first network node 111 being configured to any one or more out of:
- send a CHO configuration to the UE 120, which CHO configuration e.g. comprises an indication e.g. a flag, to release configurations of any one or more out of: MR-DC and SN terminated bearers, e.g. by means of a sending unit in the first network node 111,
- send to one or more MN target candidates for the CHO, a first indication to be derived from a determined first range of bearer identifiers that are used for MN terminated bearers, e.g. in a preparation message for CHO, e.g. by means of the sending unit in the first network node 111,
- send to one or more MN target candidates for the CHO, a second indication to be derived from a determined second range of bearer identifiers that are used for SN terminated bearers, e.g. in a preparation message for CHO, e.g. by means of the sending unit in the first network node 111,
- upon detecting that execution of the CHO according to the CHO configuration has been performed by a UE 120 in one of the target MN candidates, e.g. the second network node 112, release the MR-DC configuration and the configuration for SN terminated bearers. e.g. upon the reception of a message from a target candidate MN where the UE 120 has sent an RRCReconfigurationComplete. Related to this action of releasing of MR-DC and SN terminated bearer configurations, e.g. by means of a releasing unit in the first network node 111.

Embodiment 23. The first network node 111 according to embodiment 8, further being configured to any one or more out of:
- determine, a first range of bearer identifiers that are to be used for MN terminated bearers, e.g. by means of a determining unit in the first network node 111,
- determine, a second range of bearer identifiers that are to be used for SN terminated bearers, e.g. by means of a determining unit in the first network node 111.

Embodiment 24. The first network node 111 according to any of the embodiments 8-9, the first network node 111 further is configured to, e.g. by means of the sending unit in the first network node 111, send the CHO configuration by any one out of:
- sending a CHO configuration while the UE 120 is operating in MR-DC and/or is configured with SN terminated bearers,
- sending configurations for SN terminated bearers and/or MR-DC configurations e.g. a configuration to start operating in MR-DC, like an RRCReconfiguration message upon which the UE performs PSCell addition while the UE 120 is monitoring CHO,
- sending MR-DC configurations and/or configurations for SN terminated bearers and CHO in the same message. E.g. an RRCReconfiguration message.

Embodiment 25. The first network node 111 according to any of the embodiments 8-10, wherein any one or more out of:

the MR-DC configuration is adapted to comprise at least one of the following configurations: SCG configurations; and Measurement configurations e.g. measConfig associated with a Secondary Cell Group SCG, and the SN-terminated Radio Bearers configuration is adapted to comprise any one out of: an SN terminated bearer associated to a logical channel that is associated to a Master Cell Group MCG; or an SN terminated bearer associated to a logical channel that is associated to an SCG;

Embodiment 26. A second network node 112, e.g. configured to handle a Conditional Handover, CHO, of a User Equipment, UE, 120 from a first cell 115 to a second cell 116 in a wireless communications network 100, which second network node 112 is operable as a target candidate Master Node for the UE 120, which UE 120 e.g. is adapted to have Secondary Node, SN, terminated bearers and/or is operable in Multi Radio Access Technology Dual Connectivity, MR-DC, to be served by a first network node 111 acting as source Master Node, MN, in the first cell 115 and by a third network node 111 acting as a Secondary Node, SN, 113 in a third cell 117, the second network node 112 being configured to any one or more out of:

receive from the first network node 111, a preparation message for CHO, which preparation message for CHO is adapted to comprise a first indication derived from a first range of bearer identifiers that are used for MN terminated bearers, e.g. by means of a receiving unit in the second network node 112, receive from the first network node 111 a preparation message for CHO, which preparation message for CHO is adapted to comprises a second indication derived from a determined second range of bearer identifiers that are used for SN terminated bearers, e.g. by means of a receiving unit in the second network node 112 determine Radio Bearer identifiers for SN terminated bearers, e.g. by means of a determining unit in the second network node 112 generate a CHO target candidate configuration, e.g. an RRCReconfiguration message to be applied upon the execution of a trigger and/or execution condition, possibly configured by the source MN, the configuration being adapted to comprise at least one of the following: a list of radio bearers to be deleted e.g. in the DRBs remove list and/or SRBs remove list; and an indication to the UE 120 that the UE 120 shall delete all SN terminated bearers; e.g. by means of a generating unit in the second network node 112, and transmit to the first network node 111 e.g. the previous message e.g. the indication to the UE 120 that the UE 120 shall delete all SN terminated bearers, e.g. enabling the first network node 111 to configure the UE 120 with CHO configuration, using that message or its content as part of a CHO target configuration e.g. by means of a transmitting unit in the second network node 112.

Figure 11:
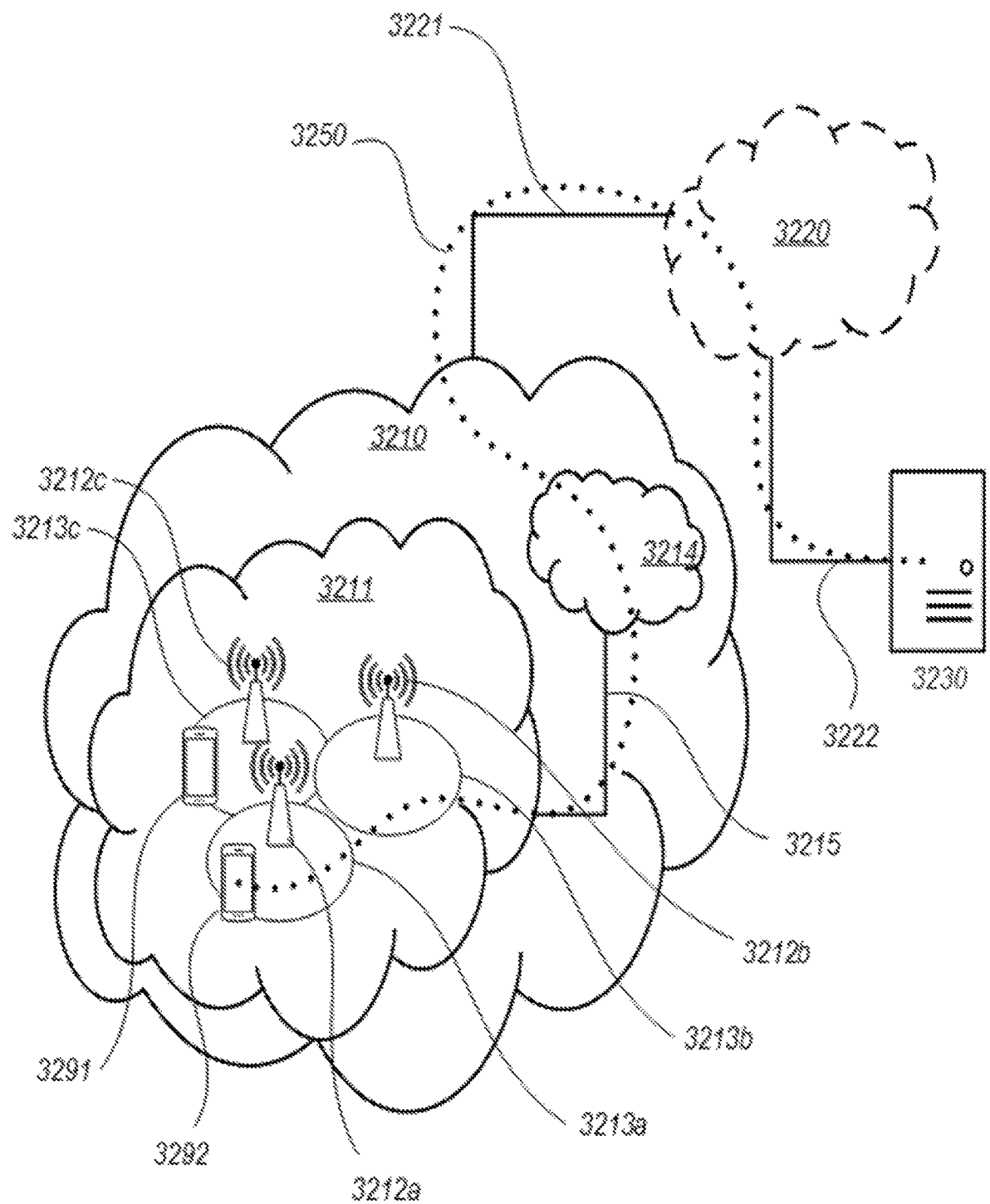
FIG. 11 schematically illustrates a telecommunication network connected via an intermediate network to a host computer.

With reference to FIG. 11, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as the source and target network node 111, 112, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) such as a Non-AP STA 3291 located in coverage area 3213c is configured to wirelessly connect to, or be paged by, the corresponding base station 3212c. A second UE 3292 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 11 as a whole enables connectivity between one of the connected UEs 3291, 3292 such as e.g. the UE 120, and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 12. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 12) served by the base station 3320. The communication interface 3326 may be configured to facilitate a connection 3360 to the host computer 3310. The connection 3360 may be direct or it may pass through a core network (not shown in FIG. 12) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 12:
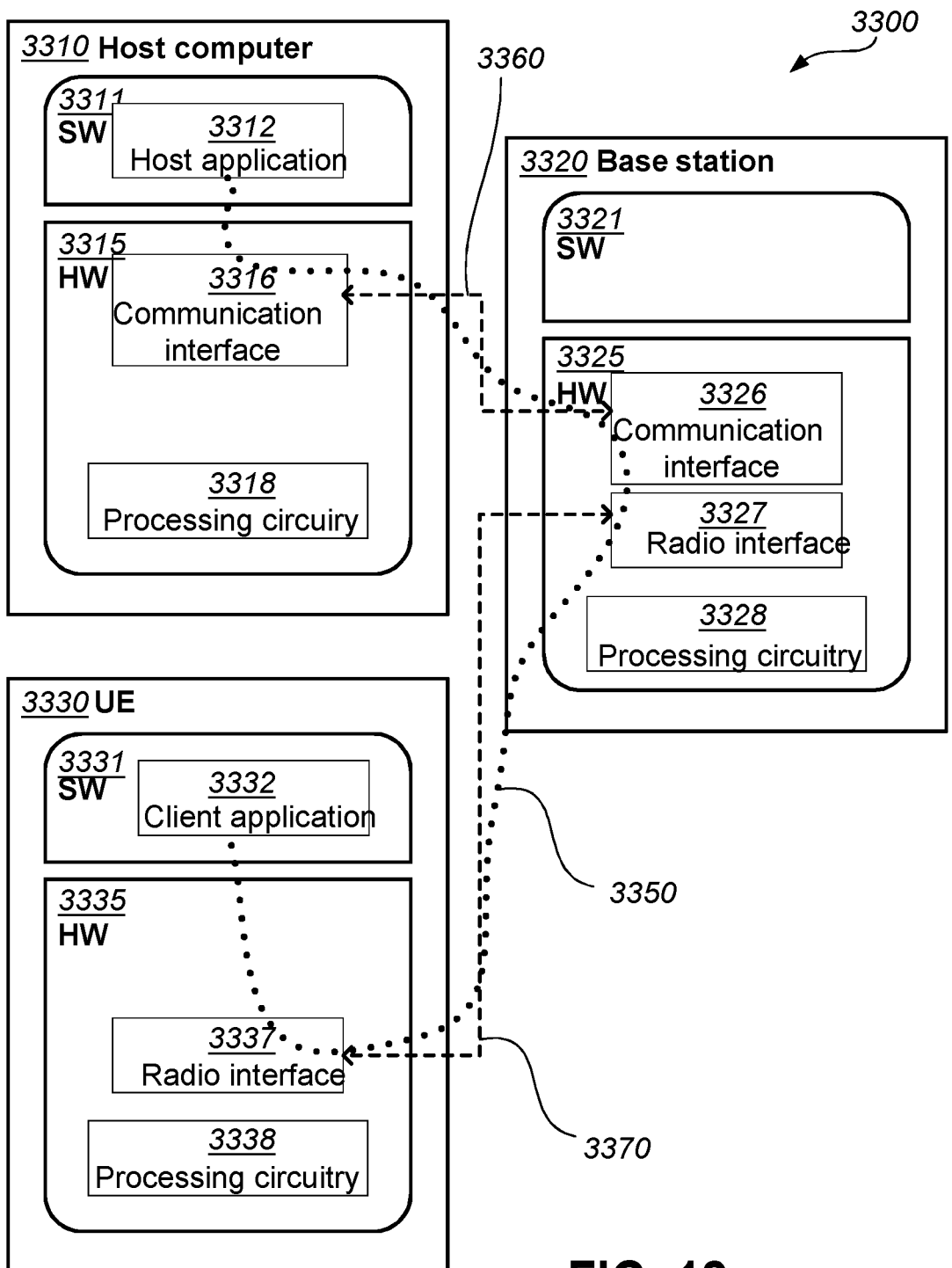
FIG. 12 is a generalized block diagram of a host computer communicating via a base station with a user equipment over a partially wireless connection.

It is noted that the host computer 3310, base station 3320 and UE 3330 illustrated in FIG. 12 may be identical to the host computer 3230, one of the base stations 3212a, 3212b, 3212c and one of the UEs 3291, 3292 of FIG. 11, respectively. This is to say, the inner workings of these entities may be as shown in FIG. 12 and independently, the surrounding network topology may be that of FIG. 11.

In FIG. 12, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption, and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 13, 14:
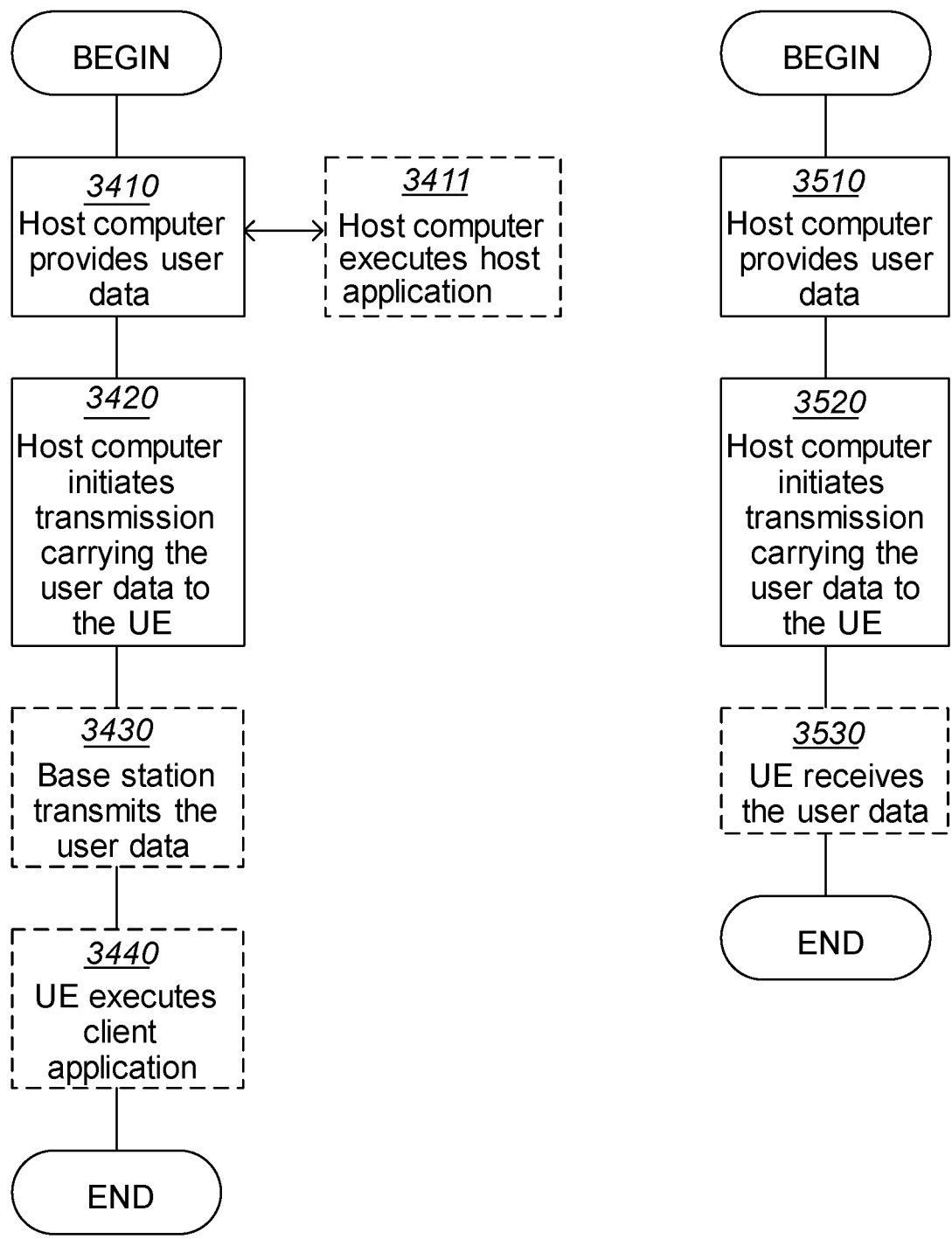

FIG. 13 is a flowchart illustrating a method implemented in a communication system, in accordance with one embodiment. The communication system includes a host computer, a base station such as a AP STA, and a UE such as a Non-AP STA which may be those described with reference to FIG. 11 and FIG. 12. For simplicity of the present disclosure, only drawing references to FIG. 13 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 14 is a flowchart illustrating a method implemented in a communication system, in accordance with one embodiment. The communication system includes a host computer, a base station such as a AP STA, and a UE such as a Non-AP STA which may be those described with reference to FIG. 11 and FIG. 12. For simplicity of the present disclosure, only drawing references to FIG. 14 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 15 is a flowchart illustrating a method implemented in a communication system, in accordance with one embodiment. The communication system includes a host computer, a base station such as a AP STA, and a UE such as a Non-AP STA which may be those described with reference to FIG. 11 and FIG. 12. For simplicity of the present disclosure, only drawing references to FIG. 15 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 16 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Abbreviation Explanation

AM—Acknowledged Mode
CHO—Conditional Handover
DC—Dual Connectivity
HO—Handover
IE—Information Element
MCG—Master Cell Group
MN—Master Node
MR-DC—Multi-RAT Dual Connectivity
NG-RAN—Next Generation-Radio Access Network
RAN—Radio Access Network
RAT—Radio Access Technology
RLC—Radio Link Control
RRC—Radio Resource Control
SCG—Secondary Cell Group
SN—Secondary Node
UE—User Equipment

The invention claimed is:

1. A method performed by a User Equipment, UE, for handling a Conditional Handover, CHO, from a first cell to a second cell in a wireless communications network, the UE being served by a Master Node, MN, in the first cell and by a Secondary Node, SN, in a third cell, the method comprising:

receiving a Radio Resource Control configuration, RRCReconfiguration, comprising a CHO configuration from the MN, the CHO configuration to be applied upon CHO execution, the CHO configuration comprising an indication to release one or more of: a Multi Radio Access Technology Dual Connectivity, MR-DC, configuration and an SN terminated bearer configuration, the MR-DC configuration comprising measurement configurations associated with a Secondary Cell Group, SCG, and the SN-terminated bearer configuration being for an SN terminated bearer associated to a logical channel that is associated to an SCG; and upon execution of the CHO according to the CHO configuration, releasing at least one of the MR-DC configuration and the SN terminated bearer configuration.

2. The method according to claim 1, wherein the receiving the CHO configuration comprises any one out of:

receiving a CHO configuration while at least one of:
the UE is operating in MR-DC; and
the UE is configured with SN terminated bearers;
receiving configurations for SN terminated bearers and/or MR-DC configurations while the UE is monitoring CHO; and
receiving MR-DC configurations and/or configurations for SN terminated bearers and CHO in the same message.

3. The method according to claim 1, wherein the MR-DC configuration comprises the SCG configuration.

4. The method according to claim 1, wherein releasing MR-DC configurations and configurations for SN terminated bearers upon the CHO execution is performed as an autonomous UE action:

when the UE is any one or more out of: operating in MR-DC, has SN terminated bearer, has stored MR-DC configurations, and has SN terminated bearer configurations.

5. A method performed by a first network node for handling a Conditional Handover, CHO, of a User Equipment, UE, from a first cell to a second cell in a wireless communications network, the first network node operating as a source Master Node for the UE, the UE being served by the source Master Node, MN, in the first cell, and by a Secondary Node, SN, in a third cell, the method comprising:

sending a Radio Resource Control configuration, RRCReconfiguration, comprising a CHO configuration to the UE, the CHO configuration to be applied upon CHO execution, the CHO configuration comprising an indication to release one or more of: a Multi Radio Access Technology Dual Connectivity, MR-DC, configuration and an SN terminated bearer configuration, the MR-DC configuration comprising measurement configurations associated with a Secondary Cell Group, SCG, and the SN-terminated bearer configuration being for an SN terminated bearer associated to a logical channel that is associated to an SCG;

sending to one or more MN target candidates for the CHO, a first indication derived from a determined first range of bearer identifiers that are used for MN terminated bearers;

sending to one or more MN target candidates for the CHO, a second indication derived from a determined second range of bearer identifiers that are used for SN terminated bearers; and upon detecting that execution of the CHO according to the CHO configuration has been performed by a UE in one of the target MN candidates, releasing at least one of the MR-DC configuration and the SN terminated bearer configuration.

6. The method according to claim 5, further comprising any one or more out of:
determining, the first range of bearer identifiers that are used for MN terminated bearers; and
determining, the second range of bearer identifiers that are used for SN terminated bearers.

7. The method according to claim 5, further, wherein the sending the CHO configuration comprises any one out of:
sending a CHO configuration while the UE is at least one of operating in MR-DC and is configured with SN terminated bearers;
sending configurations for at least one of SN terminated bearers and MR-DC configurations while the UE is monitoring CHO; and
sending at least one of MR-DC configurations and configurations for SN terminated bearers and CHO in the same message.

8. The method according to claim 5, wherein the MR-DC configuration comprises the SCG configuration.

9. A method performed by a second network node, for handling a Conditional Handover, CHO, of a User Equipment, UE, from a first cell to a second cell in a wireless communications network, the second network node operating as a target candidate Master Node for the UE, the UE being at least one of configured with Secondary Node, SN, terminated bearers and operating in Multi Radio Access Technology Dual Connectivity, MR-DC, served by a first network node acting as source Master Node, MN, in the first cell and by a third network node acting as a Secondary Node, SN, in a third cell, the method comprising:
receiving from the first network node a preparation message for CHO, the preparation message for CHO comprising a first indication derived from a first range of bearer identifiers that are used for MN terminated bearers;
receiving from the first network node a preparation message for CHO, the preparation message for CHO comprising a second indication derived from a determined second range of bearer identifiers that are used for SN terminated bearers;
determining Radio Bearer identifiers for SN terminated bearers,
generating a message comprising a CHO target candidate configuration, the configuration comprising at least one of the following: a list of radio bearers to be deleted and an indication to the UE that the UE shall delete at least one of:
all SN terminated bearers, the SN terminated bearers being for an SN terminated bearer associated to a logical channel that is associated to an SCG; and
MR-DC configurations, the MR-DC configurations comprising measurement configurations associated with a Secondary Cell Group, SCG; and
transmitting to the first network node, the generated message, enabling the first network node to configure the UE with a CHO configuration, using one of that message and its content as part of the CHO target configuration.

10. A User Equipment, UE, configured to handle a Conditional Handover, CHO, from a first cell to a second cell in a wireless communications network, the UE is to be served by a Master Node, MN, in the first cell and by a Secondary Node, SN, in a third cell, the UE being configured to:
receive a Radio Resource Control configuration, RRCReconfiguration, comprising a CHO configuration the MN, the CHO configuration to be applied upon CHO execution, the CHO configuration comprising an indication to release one or more of: a Multi Radio Access Technology Dual Connectivity, MR-DC, configuration and an SN terminated bearer configuration, the MR-DC configuration comprising measurement configurations associated with a Secondary Cell Group, SCG, and the SN-terminated bearer configuration being for an SN terminated bearer associated to a logical channel that is associated to an SCG; and
upon execution of the CHO according to the CHO configuration, release at least one of the MR-DC configuration and the SN terminated bearer configuration.

11. The UE according to claim 10, wherein the UE further is configured to receive the CHO configuration, by any one out of:
receiving a CHO configuration while the UE is operating in MR-DC and/or is configured with SN terminated bearers;
receiving configurations for SN terminated bearers and/or MR-DC configurations while the UE is monitoring CHO; and
receiving at least one of MR-DC configurations and configurations for SN terminated bearers and CHO in the same message.

12. The UE according to claim 10, wherein the MR-DC configuration is adapted to comprise the SCG configuration.

13. A first network node configured to handle a Conditional Handover, CHO, of a User Equipment, UE, from a first cell to a second cell in a wireless communications network, the first network node being operable as a source Master Node for the UE, and the UE being configured to be served by the source Master Node, MN, in the first cell and by a Secondary Node, SN, in a third cell, the first network node being configured to:
send a Radio Resource Control configuration, RRCReconfiguration, comprising a CHO configuration to the UE, the CHO configuration to be applied upon CHO execution, the CHO configuration comprising an indication to release one or more of: a Multi Radio Access Technology Dual Connectivity, MR-DC, configuration and an SN terminated bearer configuration, the MR-DC configuration comprising measurement configurations associated with a Secondary Cell Group, SCG, and the SN-terminated bearer configuration being for an SN terminated bearer associated to a logical channel that is associated to an SCG; and send to one or more MN target candidates for the CHO, a first indication to be derived from a determined first range of bearer identifiers that are used for MN terminated bearers;

send to one or more MN target candidates for the CHO, a second indication to be derived from a determined second range of bearer identifiers that are used for SN terminated bearers; and upon detecting that execution of the CHO according to the CHO configuration has been performed by a UE in one of the target MN candidates, release at least one of the MR-DC configuration and the SN terminated bearer configuration.

14. A second network node, configured to handle a Conditional Handover, CHO, of a User Equipment, UE, from a first cell to a second cell in a wireless communications network, the second network node being operable as a target candidate Master Node for the UE, the UE being at least one of configured with Secondary Node, SN, terminated bearers and is operating in Multi Radio Access Technology Dual Connectivity, MR-DC served by a first network node acting as source Master Node, MN, in the first cell and by a third network node acting as a Secondary Node, SN, in a third cell, the second network node being configured to:

receive from the first network node, a preparation message for CHO, the preparation message for CHO being adapted to comprise a first indication derived from a first range of bearer identifiers that are used for MN terminated bearers;

receive from the first network node a preparation message for CHO, the preparation message for CHO comprising a second indication derived from a determined second range of bearer identifiers that are used for SN terminated bearers;

determine Radio Bearer identifiers for SN terminated bearers;

generate a message comprising a CHO target candidate configuration, the configuration being adapted to comprise at least one of the following: a list of radio bearers to be deleted; and an indication to the UE that the UE shall delete at least one of:

all SN terminated bearers, the SN terminated bearers being for an SN terminated bearer associated to a logical channel that is associated to an SCG; and MR-DC configurations, the MR-DC configurations comprising measurement configurations associated with a Secondary Cell Group, SCG; and transmit the generated message to the first network node, enabling the first network node to configure the UE with a CHO configuration, using one of that message and its content as part of the CHO target configuration.

* * * * *